Dec. 12, 1933.　　　I. W. LITCHFIELD　　　1,938,750
BAG CLOSING MACHINE
Filed April 9, 1930　　　13 Sheets-Sheet 1

Inventor
Isaac W. Litchfield.
By
Cameron, Kerkam & Sutton.
Attorneys

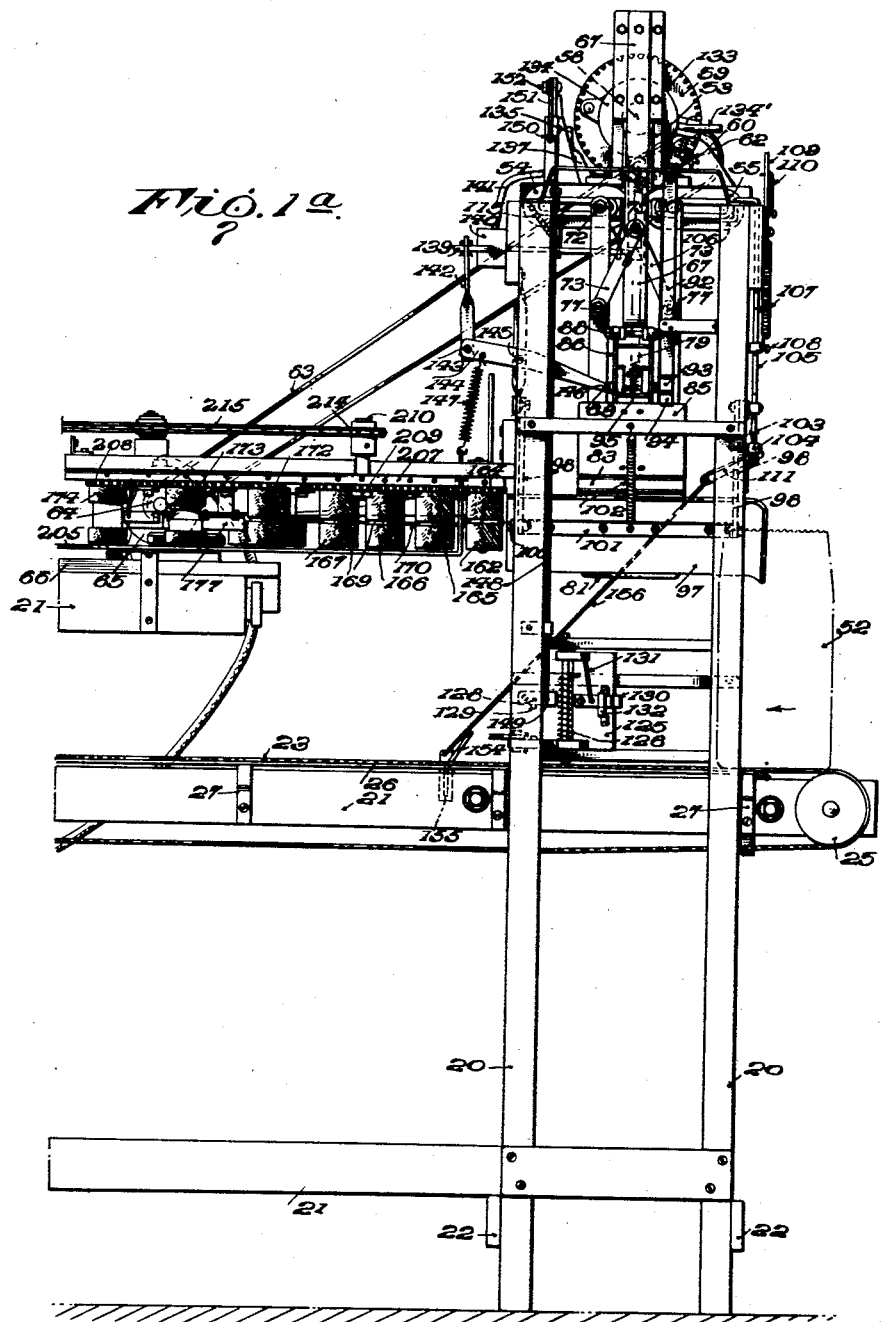

Dec. 12, 1933.   I. W. LITCHFIELD   1,938,750
BAG CLOSING MACHINE
Filed April 9, 1930   13 Sheets-Sheet 3
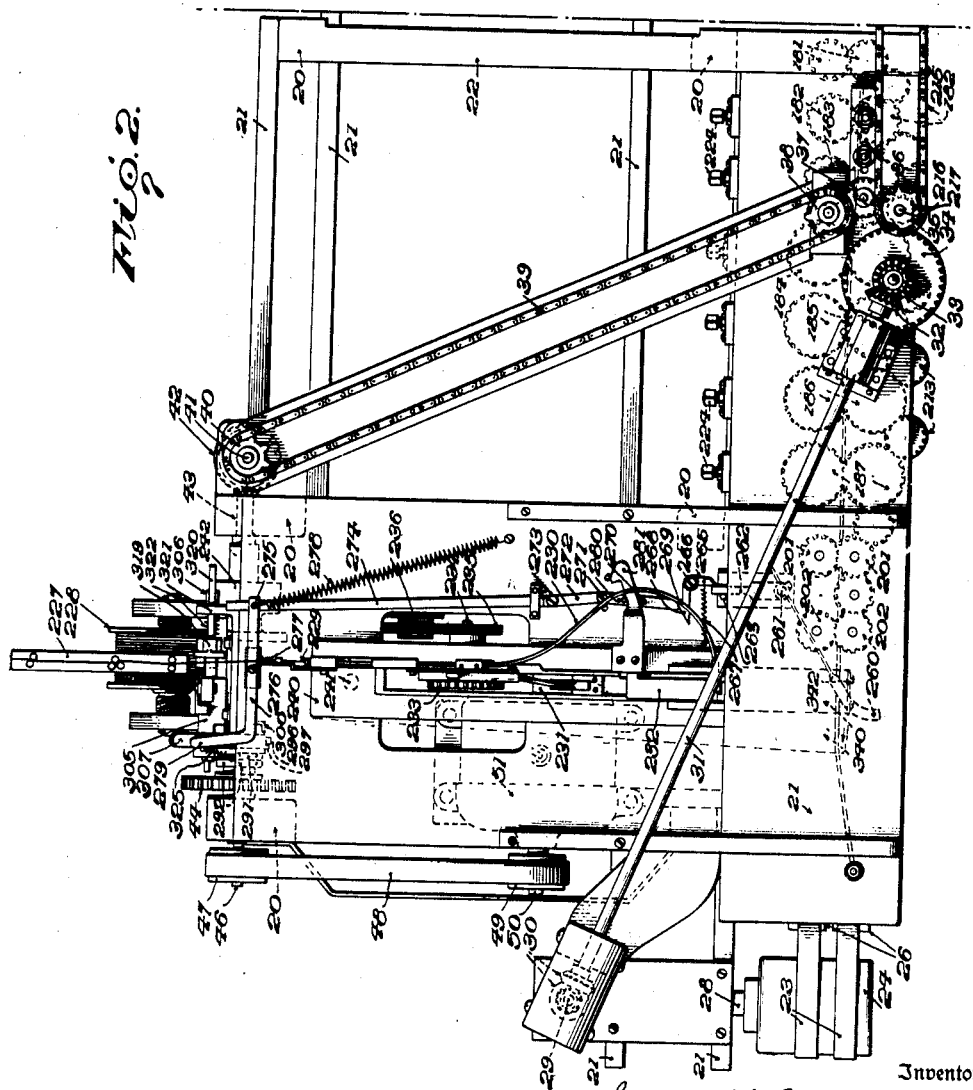
Inventor
Isaac W. Litchfield.
By
Cameron, Kerkam & Sutton
Attorneys

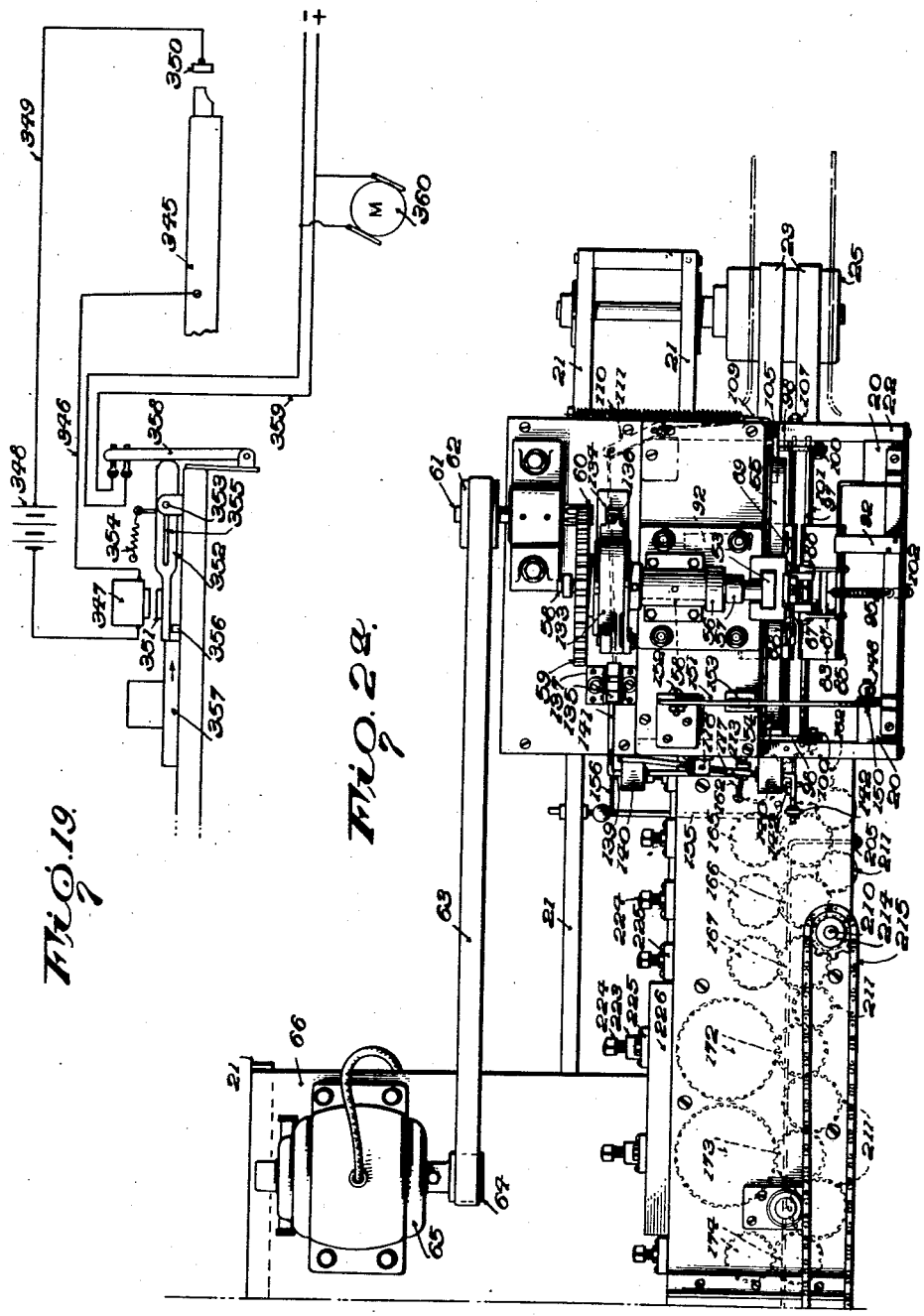

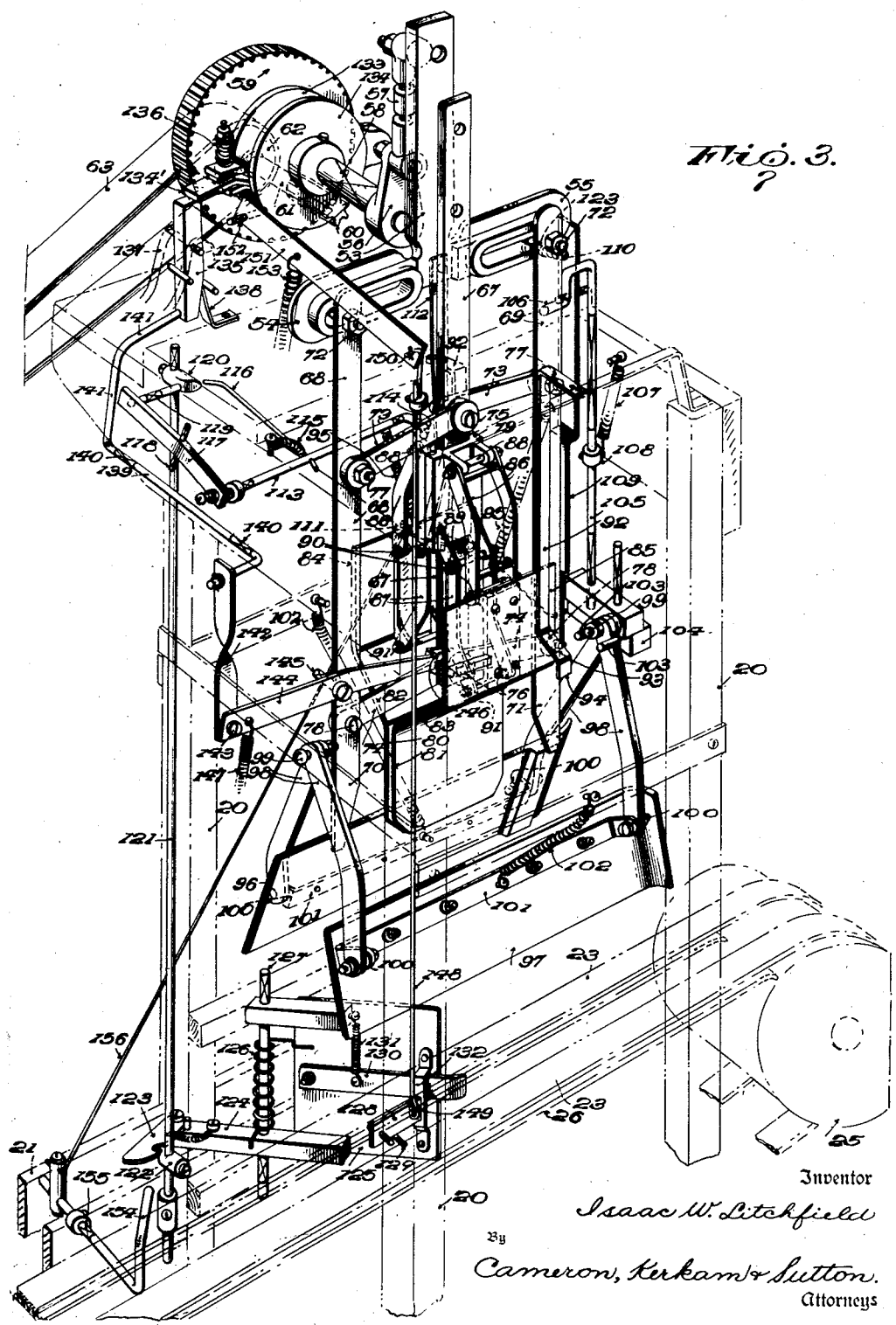

Dec. 12, 1933.  I. W. LITCHFIELD  1,938,750
BAG CLOSING MACHINE
Filed April 9, 1930   13 Sheets-Sheet 6
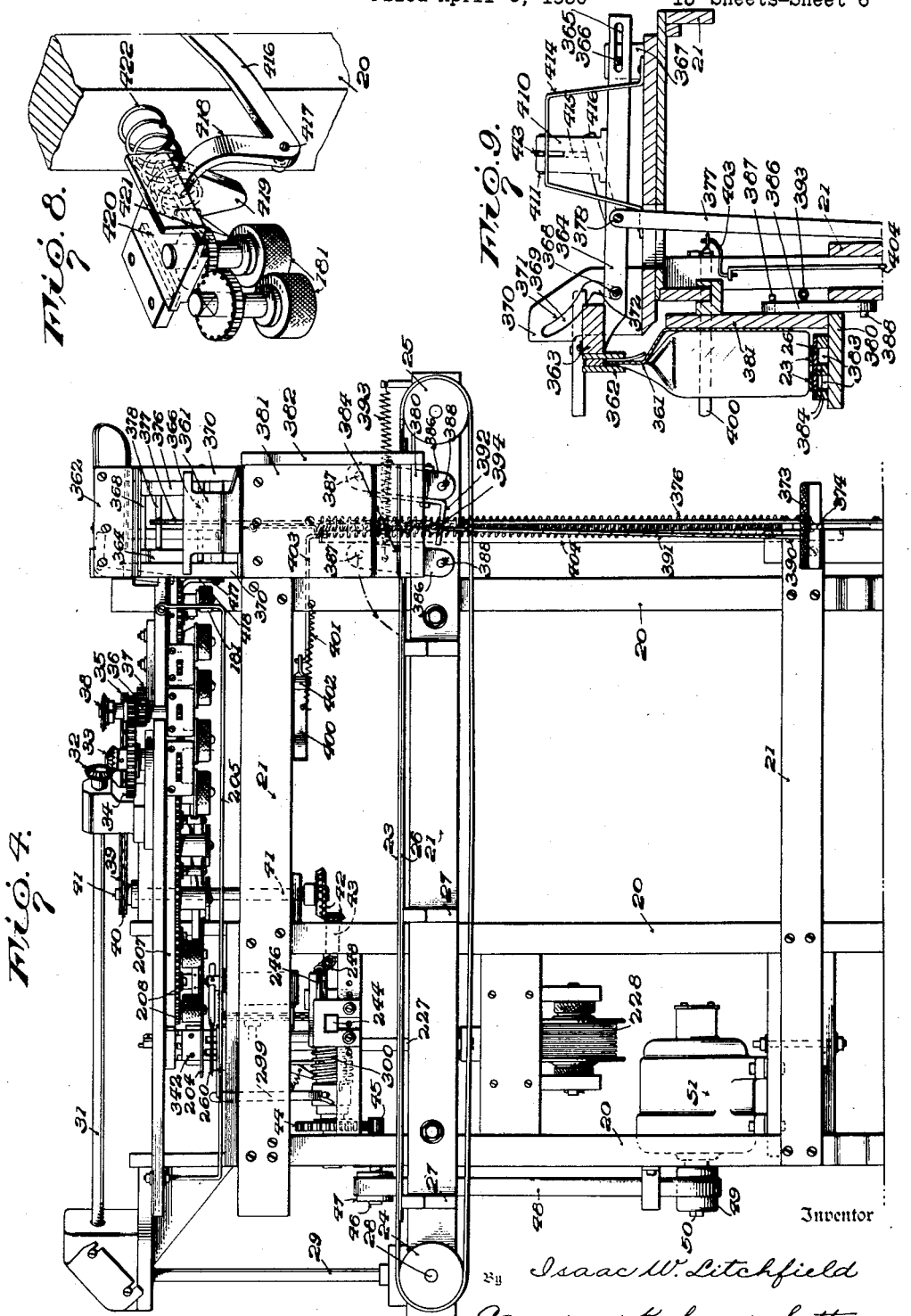
Inventor
Isaac W. Litchfield
Cameron, Kerkam & Sutton
Attorneys

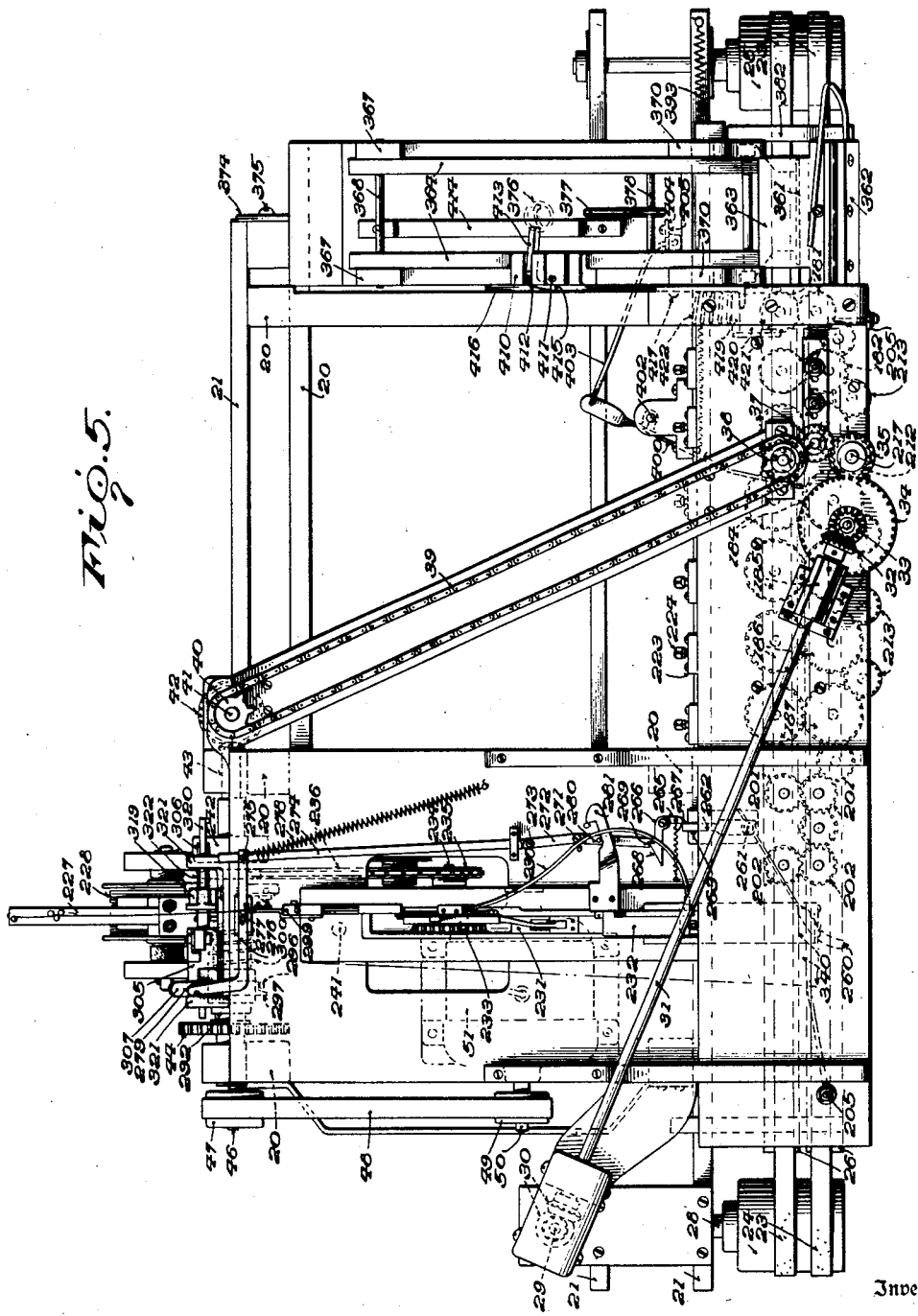

Dec. 12, 1933.  I. W. LITCHFIELD  1,938,750
BAG CLOSING MACHINE
Filed April 9, 1930    13 Sheets-Sheet 8
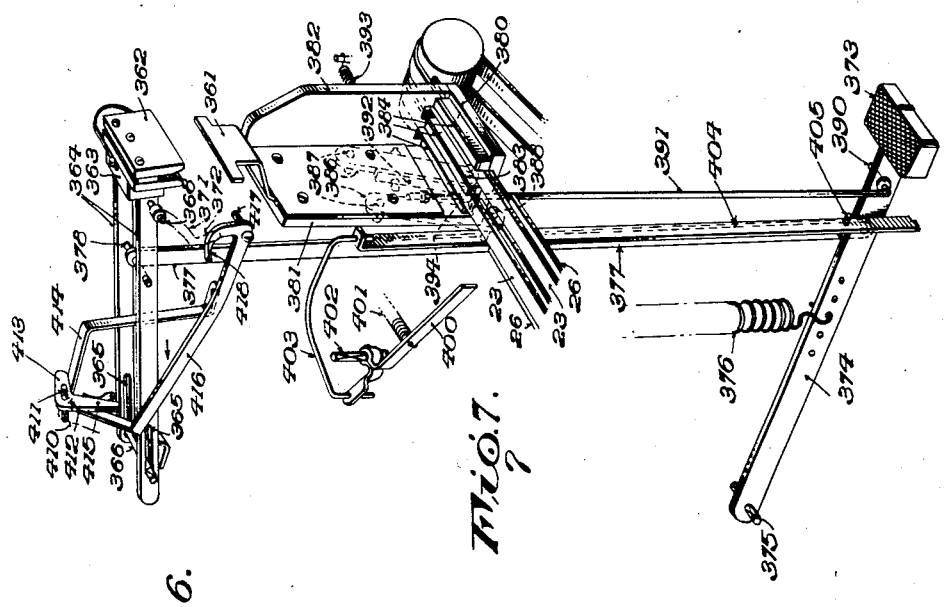
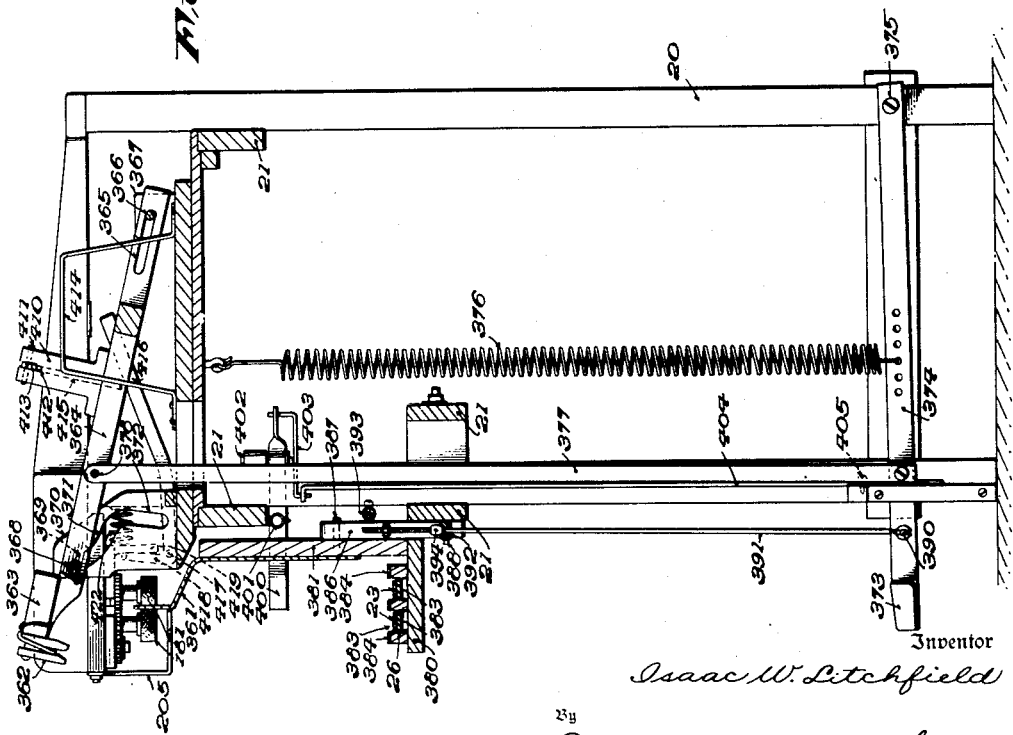
Inventor
Isaac W. Litchfield
By Cameron, Kerkam & Sutton
Attorney

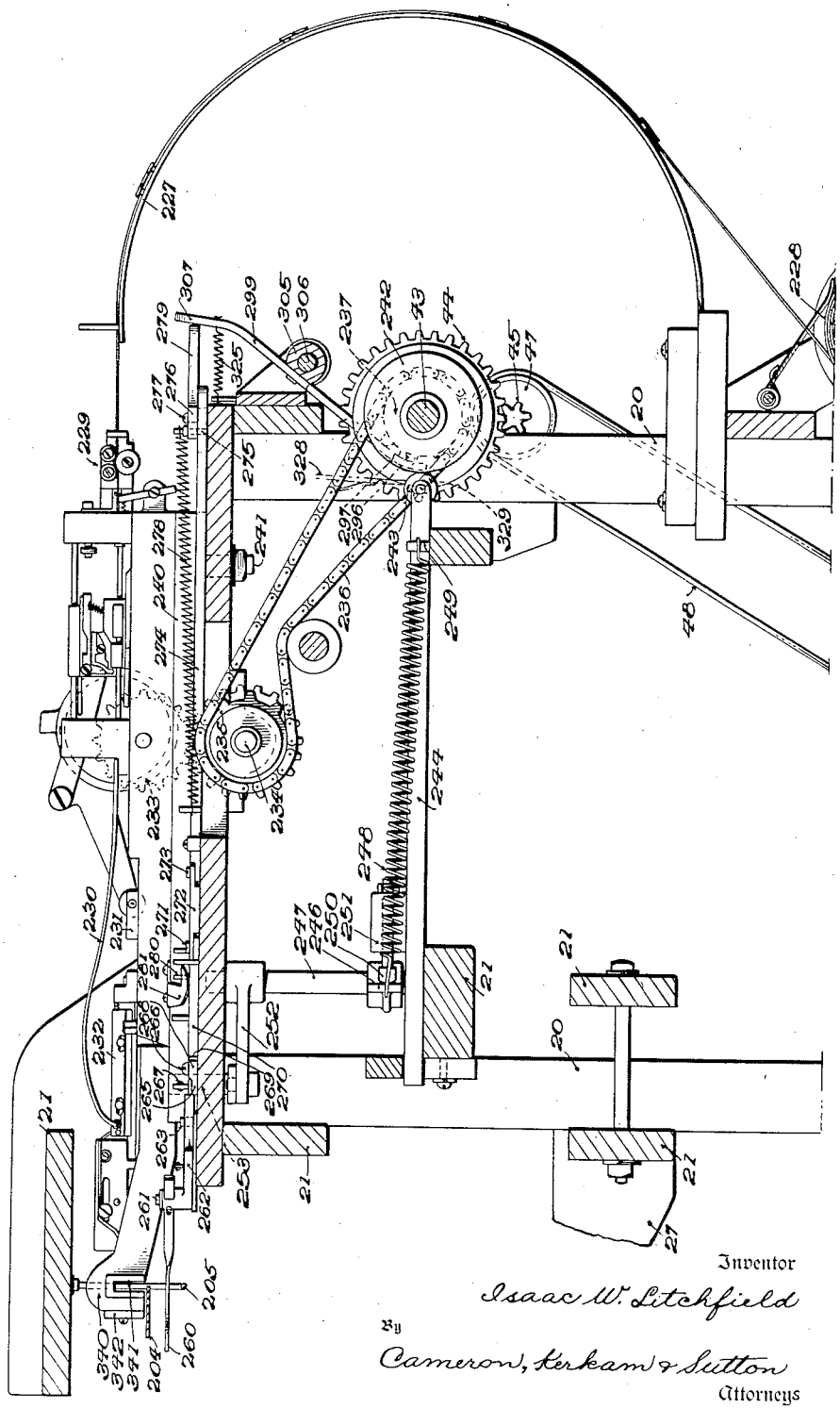

Dec. 12, 1933.  I. W. LITCHFIELD  1,938,750
BAG CLOSING MACHINE
Filed April 9, 1930   13 Sheets-Sheet 10

Inventor
Isaac W. Litchfield
By Cameron, Kerkam & Sutton
Attorney

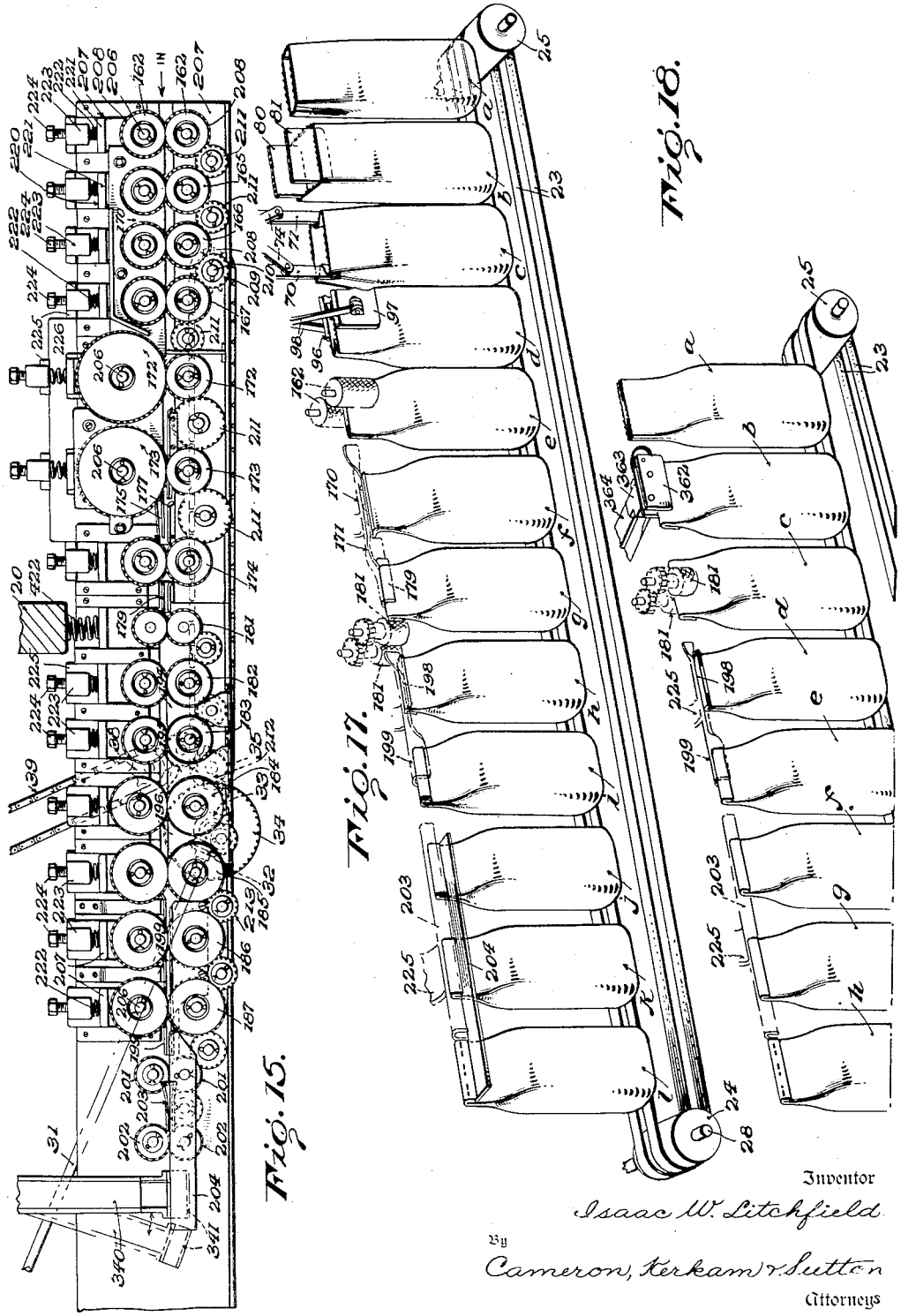

Dec. 12, 1933.  I. W. LITCHFIELD  1,938,750
BAG CLOSING MACHINE
Filed April 9, 1930  13 Sheets-Sheet 12
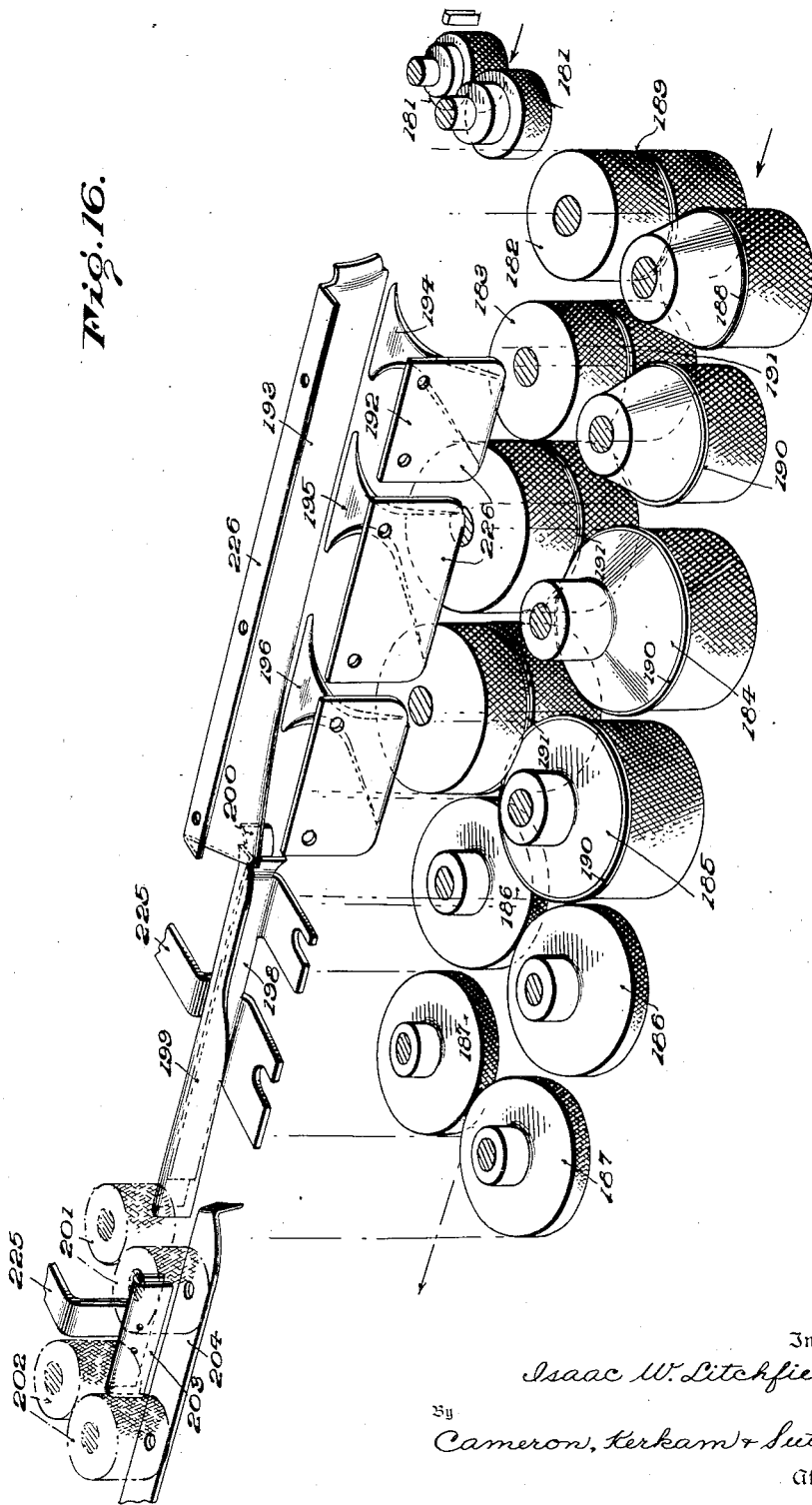
Inventor
Isaac W. Litchfield.
By Cameron, Kerkam & Sutton.
Attorneys

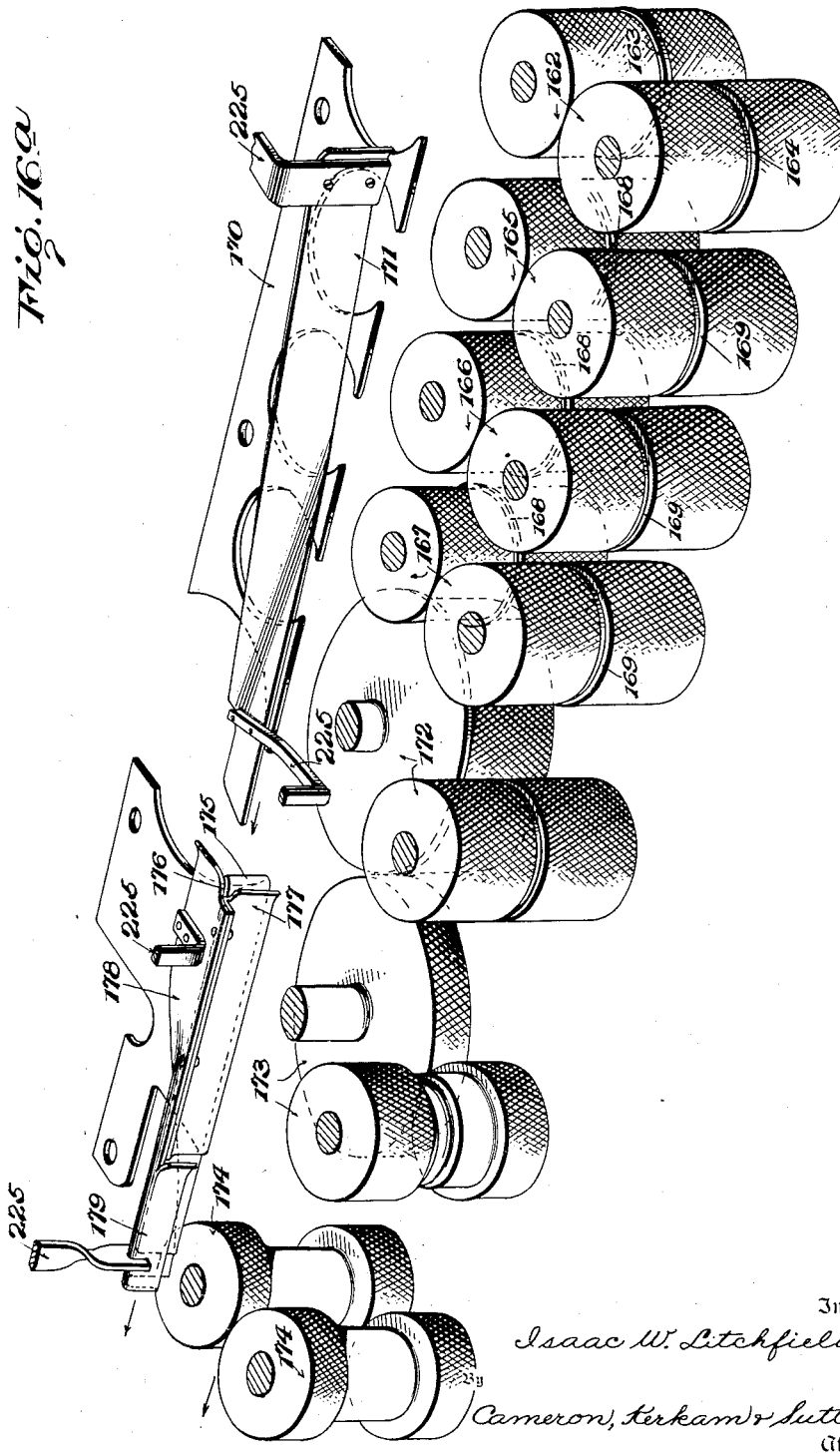

Patented Dec. 12, 1933

1,938,750

UNITED STATES PATENT OFFICE 1,938,750

BAG CLOSING MACHINE

Isaac W. Litchfield, Boston, Mass., assignor, by mesne assignments, to Saranac Bag Sealers, Inc., Benton Harbor, Mich., a corporation of Delaware Application April 9, 1930. Serial No. 442,953

79 Claims. (Cl. 93—7)

This invention relates to a method and machine for closing flexible containers of any suitable material and any suitable formation, such containers hereinafter being designated bags for convenience, and relates particularly to a method and machine for closing what may be called "filled bags", i. e. bags into which has been introduced a suitable charge and which are to be closed at the end which was open for the purpose of receiving the charge.

It is an object of this invention to provide a novel method and machine for closing filled bags whereby a strong tight closure may be rapidly effected by a continuously progressive procedure.

Another object of this invention is to provide a novel method and machine for closing bags which are equally applicable whether the open mouth of the bag is intucked mechanically or whether the open mouth of the bag is intucked by hand, as for example when the bag is originally formed with an intuck fold.

Another object of this invention is to provide a novel method and machine for closing bags whereby a bag filled in any suitable way through an open end may have its open end intucked and its lips folded and secured together by a procedure which is rapid in character and effects a strong tight closure.

Another object of this invention is to provide a novel method and machine for closing bags whereby a filled bag whether intucked mechanically or by hand may have its lips first folded into a parallel fold and then refolded into a double parallel fold and thereafter suitably secured together to effect a strong tight closure thereof.

Another object of this invention is to provide a novel method and machine for closing bags whereby a bag whether intucked by hand or mechanically and having its lips folded in any suitable way to form a suitable closure may have the folds of said closure tightly and strongly secured together by a fastening mechanism which introduces one or more fasteners while moving synchronously with the bag so that the forward movement of the bag is not interrupted.

Another object of this invention is to provide a novel method and machine for closing bags whereby one or more fastening mechanisms operating as just referred to may each introduce a plurality of fasteners in sequence and in close relation to and also preferably at high speed.

Another object of this invention is to provide a novel method and machine for closing bags as heretofore characterized which are available for producing strong tight closures in either large or small bags and whether the material be relatively stiff or relatively flexible and whether the material be relatively thick or relatively thin.

Another object of this invention is to provide a novel method and machine for closing bags as heretofore characterized which are available for producing a closure wherein the securing means are sufficiently close together to make a substantially airtight closure, to the end that even finely pulverized material will not readily sift therefrom, and the requirements of the laws respecting closures of containers for poisonous materials and the like will be satisfied.

Another object of this invention is to provide a novel method and machine for closing bags as heretofore characterized whereby the resulting closure is of such strength as to minimize the likelihood of the bag being broken open at the closure by the weight of the contained material or the rough handling to which the bag is likely to be submitted.

Another object of this invention is to provide a novel method and machine for closing bags as heretofore characterized which can be operated at high speed, so that the closure of the bag can be effected as rapidly as the filling of the bag, to the end that a single machine for closing bags may handle all of the filled bags delivered by an automatic bag-filling machine.

Another object of this invention is to provide a novel method and machine for closing bags as heretofore characterized which do not require the use of highly skilled labor, and this even though it be preferred to use hand labor for bringing the lips of the folded bag into position for folding the same.

Another object of this invention is to provide a novel method and machine for closing bags which may be entirely automatic in operation so that a filled bag may be delivered to the machine from a bag-filling machine and all of the operations for completing the closure of the bag will be entirely automatic.

Another object of this invention is to provide a machine for closing bags wherein all of the operations of intucking, folding and fastening are performed automatically and in proper sequence.

Another object of this invention is to provide a machine for closing bags having folding mechanism which is operative when and only when a bag has passed through mechanism for intucking the lips of the bag.

Another object of this invention is to provide a machine for closing bags having mechanism for applying fastening means thereto which is operative when and only when a bag has passed through the folding mechanism into proper position for receiving the fastening means.

Another object of this invention is to provide a machine of the type just referred to wherein the machine will be automatically stopped whenever the folds of a bag are not properly fastened.

Another object of this invention is to provide a machine for closing bags which employs an oscillating mechanism for introducing fasteners which moves with the bag during the introduction of a fastener so that there is no stoppage in the forward motion of the bag during the fastening operation.

Another object of this invention is to provide a machine for closing bags which is provided with improved means for operating and controlling a stapling mechanism.

Another object of this invention is to provide a machine for closing bags which is operable at a relatively high speed, which is relatively simple in construction and certain in operation so as to require the minimum of attention and adjustment, and which is strong and rugged in construction.

Other objects of the invention will appear as the description of the invention proceeds.

The invention is capable of receiving a variety of mechanical expressions, two of which are shown on the accompanying drawings, but it is to be expressly understood that the drawings are for purposes of illustration only and are not to be construed as definitions of the limits of the invention, reference being had to the appended claims for that purpose.

Referring in detail to the drawings, wherein the same reference characters are employed to designate corresponding parts in the several figures:

Figs. 1 and 1a together constitute a side elevation of a machine embodying the present invention and effecting the intucking, as well as the folding and fastening, operations automatically;

Figs. 2 and 2a are plan views corresponding to Figs. 1 and 1a, respectively;

Fig. 3 is a perspective view of the operating elements of the intucking mechanism;

Fig. 4 is a side elevation of another embodiment of the present invention which does not employ automatic intucking mechanism;

Fig. 5 is a plan view of the machine of Fig. 4 on a somewhat larger scale;

Fig. 6 is a transverse section through the first-stage folding mechanism of the machine of Figs. 4 and 5;

Fig. 7 is a perspective view of the operating parts of the first-stage folding mechanism of the last referred to embodiment;

Fig. 8 is a detail perspective of mechanism for opening the first pair of rolls to receive the fold effected by the first-stage folding mechanism;

Fig. 9 is a fragmentary transverse section to illustrate the operation of the said first-stage folding mechanism;

Fig. 10 is a transverse section showing the stapling mechanism of both embodiments in elevation;

Fig. 15 is an inverted plan view of the folding mechanism of the embodiment of Figs. 1, 1a, 2, 2a and 3;

Figs. 16 and 16a are perspective views to illustrate the elements of said folding mechanism;

Fig. 17 is a diagrammatic view illustrating the sequence of operations to which the mouth of the filled bag is subjected as it passes through the machine of Figs. 1, 1a, 2, 2a and 3;

Fig. 18 is a similar diagrammatic view illustrating the sequence of operations to which the mouth of the filled bag is subjected in the embodiment of Figs. 4 to 9; and Fig. 19 is a diagrammatic view illustrating automatic stop mechanism which may be embodied with the stapling mechanism.

Figure 1:
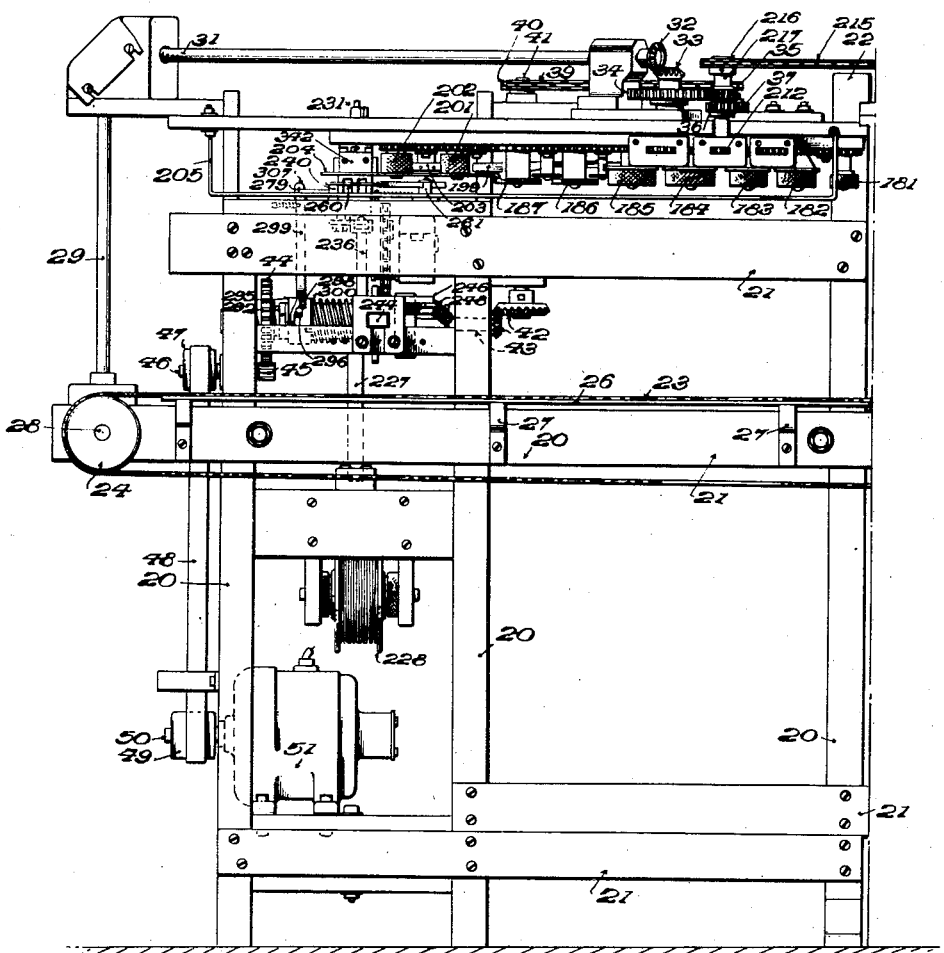

In the embodiment shown in Figs. 1, 1a, 2, 2a, 3, 15, 16, 16a and 17, the machine has a frame of any suitable size, construction and material and illustrated as composed of suitable uprights 30, which may also constitute legs for the machine, and suitable longitudinal members 21 and transverse members 22 connecting said uprights, so as to provide a stiff, rugged and rigid framework for the operating elements to be described.

Suitably mounted at one side of the machine is an endless carrier 23 of any suitable type and construction, being shown as composed of a plurality of endless belts which pass over and around suitable pulleys 24 and 25. The upper reach of the endless carrier 23 has associated therewith a suitable stationary track or platform 26 which underlies the endless carrier and is mounted in any suitable way, as by brackets 27, on the frame of the machine, so that the endless carrier 23 is supported from below throughout that portion thereof which is actively carrying the weight of the filled bags during the operations to be described. The endless carrier 23 may be driven in any suitable way. As shown, the shaft 28 of pulley 24 is driven in any suitable way, as by bevel gears, from the vertical shaft 29 which in turn is suitably driven, as by bevel gears 30, from a horizontally extending shaft 31. Shaft 31 at its forward end carries a bevel gear 32 which meshes with a bevel gear 33 on the shaft or pinion 34 which in turn is driven through a suitable gear train 35, 36, 37 from a pinion on the shaft of a sprocket wheel 38. Sprocket wheel 38 is driven by a chain 39 from a sprocket wheel 40 on a vertical shaft 41 which in turn is driven through bevel gearing 42 from a horizontally extending shaft 43. Shaft 43 is driven in any suitable way, as by a pinion 44 thereon which is in mesh with a pinion 45 on a stubshaft 46 that carries a pulley 47, and which pulley is driven by a belt 48 from a pulley 49 on the shaft 50 of an electric motor 51 which may be conveniently mounted on the frame of the machine. In place of a motor individual to the machine, however, the machine may obviously be driven in any other suitable way, as for example from line shafting.

As shown in Fig. 1a the endless carrier 23 extends to the right of the machine sufficiently so that, if desired, the machine may be coupled with or associated with any suitable form of bag-filling machine to the end that the filled bags may be delivered automatically therefrom to the endless carrier, but, obviously, filled bags may be placed by hand on the endless carrier, if preferred. A filled bag delivered to the endless carrier and ready to enter the machine is diagrammatically indicated at 52 in Fig. 1a.

In this embodiment of the invention, the open end of the bag is automatically intucked and its lips brought into lateral contact during the first stage of its passage through the machine and thereafter the bag is moved into operative relationship with suitable folding mechanism, such as hereinafter described. The intucking mechanism may be of any suitable construction so far as the broader aspects of this invention are concerned, the intucking mechanism herein illustrated and described being more particularly illustrated and described and also claimed, in my copending application from which have matured Letters Patent No. 1,851,626 granted March 29, 1932, for Intucking mechanism to which reference is made for a more complete understanding of the details of construction and operation of such intucking mechanism.

As shown in Fig. 3, the intucking mechanism comprises a rectilinearly movable head 53 which is provided with oppositely extending slotted arms 54 and 55, said head being vertically movable in suitably provided ways, and being driven in any suitable way, as by a crank 56 and connecting rod 57 from a shaft 58 which carries a pinion 59 in mesh with a pinion 60 on a shaft 61. Shaft 61 carries a belt pulley 62 driven by a belt 63 from any suitable source of power, as a belt pulley 64 on the shaft of an electric motor 65, here shown as mounted on a platform 66 extending rearwardly from the frame of the machine. Extending downwardly in front of the head 53 in parallelism with its path of movement is a stationary bar 67, and depending from the arms 54, 55 of the head 53 are the operating bars 68 and 69 of a pair of tucker blades 70 and 71. Each of said bars 68 and 69 carries at its upper end a pin 72 which may slide in the slot of the corresponding arm 54 or 55, and said bars are moved in and out, in said slots, as the head 53 moves up and down in its ways, by means of two pairs of links 73 and 74 which are pivotally attached to the stationary bar 67 at 75 and 76 and to the intucker bars 68 and 69 at 77 and 78. The links 73 and 74 are parallel and hence provide a parallel motion device, whereby the intucker bars 68 and 69 and the intucker blades operated thereby always move in and out in parallel relationship.

Slidably mounted on the stationary vertical bar 67 is a head 79 to which is pivoted lateral plates for expanding the mouth of the bag. These blades may be of any suitable construction and operatively attached to the head 79 in any suitable way for performing the functions to be described. As shown, two lateral plates 80 and 81 are provided with outwardly diverging portions 82 and 83 and upper vertically extending portions 84 and 85, and the plate portions 84 and 85 are attached to the head 79 by two pairs of parallel links 86 and 87, each link being shown as composed of parallel arms and transverse reenforcing members. The links 86 for each lateral plate are pivotally attached to the head 79 adjacent its upper end as shown at 88 and the links 87 for each lateral plate are pivotally attached to the head 79 adjacent its lower end as shown at 89. Said links are also similarly pivoted to each of the portions 84 and 85 of the lateral plates as shown at 90 and 91. Therefore, the lateral plates 80 and 81 are maintained in parallel relationship by these parallel linkage connections as the head 79 moves upwardly and downwardly on the stationary bar 67. The lateral plates are retained in the relationship shown in Fig. 3 when the head 79 is at the upper end of its stroke by guide bars 92 which engage the upper portions 84, 85 of said plates. Toward their lower ends said bars are flared outwardly as shown at 93, and terminate in vertical portions 94 to engage the plate portions 84 and 85 and limit the extent to which the lateral plates may be separated as they descend with the head 79. Diagonally extending springs 95 are attached to said plates at one end and to the frame at their other end and urge the plates apart so that as soon as the upper portion of said plates come opposite the flared portions 93 of said guide bars the springs 95 pull said plates apart until they engage the extensions 94.

To press the lips of the bag together as the tucker blades move inwardly, and also move the lateral blades inwardly as the tucker blades move the ends of the bag inwardly, there are also provided a pair of pressure plates 96 and 97 which receive the filled bag between them. As shown, these plates are mounted on the frame of the machine by a pair of links 98 at each end thereof, said links being pivoted to the frame at 99 and to the upstanding ends 100 of brackets 101 suitably secured to the rear faces of the pressure plates. The pressure plates are normally urged apart by coil springs 102 attached at one end to the bracket 101 and at the other end to the frame of the machine.

To move the pressure plates toward each other a pair of pins 103 are mounted on a rectilinearly movable head 104 and are adapted to engage the links 98 on their outer edges and force the links toward each other as said pins 103 move downwardly with the head 104. Head 104 is carried by a rod 105 which extends upwardly through and is suitably guided by brackets on or apertures formed in the machine frame, and at its end said rod 105 is bent inwardly as shown at 106 so as to lie in the path of operation of the lateral arm 55 on head 53 as it moves downwardly. Rod 105 is normally urged into its uppermost position by a coil spring 107 attached at its lower end to a collar 108 on said rod and at its upper end to the frame of the machine. The head 104 and pins 103 may be locked in their lowermost position by a lock bar 109 pivoted to the frame adjacent its upper end and adapted to be swung inwardly, to engage a notch in its edge over the top of the head 104, under the action of a coil spring 110 when the head 104 has been moved to its lowermost position by the action of the arm 55 on the inwardly projecting end 106 of the bar 105, in which position the pins 103 hold the links 98 in their innermost position with the pressure plates 96 and 97 retaining the bag mouth in the formation given it by the intucker blades. As the pressure plates 96 and 97 are forced inwardly they force the lateral plates 80 and 81 inwardly ahead of them and thereby the latter plates permit the sides of the bag mouth to collapse as the intucker blades draw in the ends, these motions being synchronous because all are effected by the downward movement of the head 53.

The lock bar 109 may be tripped at an appropriate time by means of a trip lever 111 pivoted to the frame of the machine and having a link connection with the lower end of the lock bar 109, so that when said lever 111 is rotated around its axis as hereinafter described, the lock bar 109 will be moved about its pivot against the tension of the spring 110 to release the head 104, whereupon the rod 105 will be pulled to its uppermost position by the coil spring 107, thereby moving the pins 103 upwardly to release the links 98, and permit the coil springs 102 to move the pressure plates 96 and 97 to their outermost position.

The head 79 drops by gravity when tripped as will be described, and is moved to its upper position by means of connections automatically established between the head 53 and said head 79 when the head 53 is moved to the bottom of its stroke. In the form shown, the head 53 carries a depending resilient bar 112 which has a hook-like extremity that is adapted to engage under a transverse member on the cross head 79, such as the pivot pin 88 for the inside link 86. During the downward movement of head 53 the resilient bar 112 is lowered therewith until its hook-like extremity engages under the pin 88, being deflected laterally against its inherent resiliency and then snapping its hook-like end underneath said pin. As the head 53 rises the head 79 is raised to its uppermost position.

To permit the cross head 79 to drop, means are provided for deflecting the bar 112 so as to disengage its hook-like end from the pin 88. In the form shown, a rotatably and longitudinally movable rod 113 has at its inner end a laterally deflected cam portion 114. Rod 113 may be moved inwardly against the tension of a coil spring 115 attached at one end to the frame and at the other end to a radially projecting rod 116. Rod 116 also cooperates with a part of the framework to limit the extent of rotation of the rod 113 around its own axis, under the pull of the spring 115, when the head 79 moves away from the bent end 114 of rod 113. At its outer extremity rod 113 coacts with one end of a lever 117 pivotally mounted in a bracket at 118, the opposite end of said lever coacting with a thrust pin 119 mounted in the frame of the machine and projecting inside thereof, where it cooperates with an arm 120 on a vertically extending rotatable rod 121. The lower end of said rod 121 carries a notched arm 122 which cooperates with a pawl 123 carried by a bar 124 secured to a gate 125 which is normally urged forwardly of a transverse position with respect to the endless carrier 23 by a coil spring 126 around the pivot 127 of said gate. When said gate 125 is moved toward the left as viewed in Fig. 1a by a filled bag as it enters the intucking device, the pawl 123 on said gate, by its coaction with the notched arm 122 on the vertical rod 121, causes a rotation of the latter which in turn causes the arm 120 to exert a thrust on the pin 119 and thereby tilt lever 117 to thrust inwardly on the bar 113, causing the curved end 114 to deflect the resilient bar 112 to withdraw its hook-like end from the pin 88 and permit the cross head 79 to fall under its own weight.

The gate 125 is prevented from passing beyond a position transverse to the endless carrier 23 by a pivoted detent plate 128 which normally lies against a stop 129 and in the path of a pivoted latch 130 carried by the gate 125, said latch 130 being normally urged upward by a spring 131 attached at its opposite ends to said latch and gate. Said latch is guided by a plate 132. When the parts are in the position shown in Fig. 1a, the detent plate 128 is in the path of the latch 130, so that a filed bag entering the machine moves the gate 125 against the detent 128 and the filled bag is there retained in centered relation with respect to the intucking mechanism heretofore described.

The endless belt may slip with respect to the filled bag during the period that the latter is retained in alignment with the intucking mechanism, or if preferred suitable means may be provided for lifting the bag off of the endless carrier during the period that it remains in alignment with the intucking mechanism, as is described hereinafter in conjunction with another embodiment of this invention. With small bags and bags filled with light material, there is less objection to the carrier slipping with respect to the bag than with heavier bags and bags filled with heavier material.

Means are provided for starting the operation of the shaft 58 when the bag is suitably positioned with respect to the intucking mechanism and for stopping said shaft at the end of its cycle of operation. Any suitable clutch mechanism may be provided for this purpose. As shown, a friction clutch 133, of the band brake type, is carried by a plate 134 secured to the shaft 58 and surrounds the constantly rotating hub of the pinion 59. Said friction clutch 133 carries a projection 134' designed to engage a pivotally mounted detent 135 for releasing the clutch bands against the tension of a spring 136. Detent 135 is pivotally mounted in a bracket 137 and may be moved against the tension of a spring 138 to release the clutch by the engagement with its lower end of a bent rod 139 rotatably mounted in brackets 140 and having an upwardly and laterally bent end 141. Pivotally attached to the forward bent end of said rod 139 is a link 142 which extends downwardly and is pivotally attached at 143 to a lever 144 pivoted at 145 in the framework and having its inner end 146 in the path of the head 79. End 146 of said lever is normally urged upwardly by a spring 147 attached to said lever and the frame. When said head 79 moves downwardly into its lowermost position the lever 144 is operated to cause the bent end 141 of the rod 139 to move against and turn the detent 135 around its pivot, thereby releasing the clutch plate 133, whereupon the clutch is tightened by its spring 136, and the mechanism heretofore described is driven through one complete revolution of the shaft 58 and until the projection 134' on the clutch bands again engage said detent 135 to open the clutch.

At the end of the intucking operation the detent plate 128 is raised to permit the gate 125 to be swung lengthwise of the carrier by the pressure exerted thereon by the bag, which is being pressed against the gate by the endless carrier 23, and to this end the detent plate 128 is lifted by the lower end by a vertically extending rod 148 which is suitably carried and guided by brackets on the side of the frame, and has at its lower end a hook 149 and at its upper end a pivotal attachment at 150 to a lever 151 pivotally mounted on a bracket at 152 and normally pulled downwardly by a coil spring 153. As the head 53 moves downwardly, the arm 54 permits the lever 151 to move downwardly to engage the hook end of rod 148 under detent plate 128. As the head 53 moves to its uppermost position the lever 151 is operated thereby to raise rod 148 and detent plate 128, thereby permitting the latch 130 and gate 125 to swing under the pressure of the bag. As the gate swings back, after the bag has left it, the latch 130 is deflected downwardly against the tension of its spring 131, as the latch rides under the detent plate 128, and the parts are restored to initial position.

As the bag moves out of the intucking mechanism it engages a trip member 154 which is rotatably mounted at 155 and connected through link 156 with the trip lever 111 heretofore described, so that the pressure plates 96 and 97 are released after the closed mouth of the bag is engaged by the folding mechanism.

Summarizing briefly the sequence of operations of the intucking mechanism so far described, the filled bag 52, placed by hand or automatically on the right-hand extending portion of the endless carrier 23, as viewed in Fig. 1a, and shown at a in Fig. 17, is moved by the endless carrier into the intucking device until it engages the gate 125, swinging the latter around its pivot 127 until the latch 130 on the gate 125 is pressed against the detent 128, in which position the bag is centered in the machine for the operation of the intucking mechanism. As the gate 125 moves from the position shown in Fig. 1a to its position at right angles to the endless carrier, wherein the latch 130 is pressed against the detent plate 128, the pawl 123 on the gate, by its coaction with the arm 122 on the rod 121, causes the latter to rotate and the arm 120 on said rod to exert a thrust on the thrust rod 119, moving lever 117 around its fulcrum and exerting a thrust on the rod 113, whereby the bent end 114 thereof deflects the resilient bar 112 and withdraws its hook-like end from underneath the pin 88, whereupon the head 79 falls under its own weight. As said head falls the lateral plates 80 and 81 move downwardly in contiguous relationship, being restrained against outward movement by the guide bars 92 until the upper edges of the lateral plates come opposite the laterally deflected portions 93 of said bars, whereupon said lateral plates are pulled outwardly by the springs 95, until said lateral plates engage the depending extensions 94. The endless carrier has so disposed the bag with respect to this mechanism that the lower portions of the lateral plates 80 and 81 have entered the mouth of the bag before these plates come opposite the deflected portions 93 of the guide bars 92, and the separation of the lateral plates 80 and 81 under the action of the springs 95 is just sufficient to expand the mouth of the bag into a fairly taut rectangular form, see b, Fig. 17, overstretching of the mouth of the bag being prevented by the depending extensions 94.

Throughout the operation so far described, the pressure plates 96 and 97 have been held in their separated position by the springs 102, the bag having been suitably guided between said plates by forwardly extending projections on said plates or by suitably flaring the inlet ends of said plates. As the cross head 79 reaches its lowermost position it hits the end of lever 144, which thrusts upwardly on the link 142 and rotates the rod 139 on its axis, causing its end 141 to thrust inwardly and tilt the detent 135 which has been holding the bands of the friction clutch 133 in declutched condition. Under the action of spring 136 the clutch connects the hub of the constantly running pinion 59 with the shaft 58, and the crank 56 and connecting rod 57 are operated to lower the head 53 and move the lateral arms 54 and 55 downwardly. Owing to the parallel linkage connections between the tucker blades bars 68 and 69 and the stationary bar 67, said blades are moved inwardly in parallel relation to engage the sides of the mouth of the bag as it is held open by the lateral plates and produce intucks in the two ends of the bag, as see c in Fig. 17. Simultaneously, with this motion of the intucking blades, the arm 55 on the head 53 is pressing downwardly on the inwardly directed end 106 of the rod 105 and forcing the head 104 downwardly, so that its pins 103 are pressing the links 98 inwardly and thereby the pressure plates 96 and 97 are pressed toward each other. The pressure plates simultaneously press the depending ends 80 and 81 of the lateral plates inwardly, this motion being synchronous with the motion of the intucker blades, permitting the bag mouth to contract transversely as the tucks are formed. This synchronous movement of the intucking blades and the lateral plates and pressure plates is continued until the lateral lips of the bag are brought into close relationship, in which position the intucker blades are inside of the intucked folds and the lateral plates are closely adjacent each other inside of the bag, and the bag lips are held in this position by the pressure of the pressure plates thereon.

When the head 104 reaches its lowermost position the lock bar 109 is moved under the action of its spring 110 into engagement therewith and the pressure plates are locked in their innermost position. At the lowermost position of the head 53 the hook-like end on the resilient bar 112 engages under the pin 88, and as the crank continues its rotation, the head 53 is raised, thereby not only raising the arms 54 and 55 to move the intucker blades out of the folds that they have formed, but also carrying the head 79 upwardly therewith to withdraw the lateral plates, said head 79 at the upper end of its stroke engaging the bent end 114 of the rod 113 and rotating it around its axis through a small arc against the tension of its spring 115, thereby positioning the bent end 114 for its next release of the resilient bar 112. At the end of its cycle of rotation the clutch bands 133 are declutched when the projection 134' engages the detent 135.

As the head 53 reaches its uppermost position it engages and moves upwardly the lever 151 pulling up on the rod 148 and withdrawing the detent plate 128 from the path of the latch 130, whereupon the bag may swing the gate 125 forwardly under the action of the endless belt 23. Throughout this part of the operation the pressure plates 96 and 97 are locked in their innermost position, holding the lips of the bag tightly closed in the form given them by the intucking mechanism heretofore described, see d, Fig. 17, and the pressure plates are retained in this position until the bag has become well engaged with the succeeding mechanism which is to make the folds for closing the lips of the bag. When the bag has moved forwardly with the folding mechanism, however, the member 154 is tripped by the bag and through the link 156 the lever 111 is actuated to release the head 104, whereupon the rod 105 is elevated by its spring 107 and the parts are all now restored to their original positions, ready for actuation by the next filled bag as it enters the machine and engages the gate 125.

While the intucking mechanism illustrated in the drawings has thus been described with considerable particularity, it is to be expressly understood that the invention of this application is not restricted to the use of this particular intucking mechanism, or in fact to any intucking mechanism as will appear from the description of another embodiment, the intucking mechanism here illustrated and described forming the subject matter of the separate application heretofore referred to.

As the filled bag, with the lips of its mouth held folded by the pressure plates 96 and 97, moves out of the intucking mechanism on the endless carrier 23, the bag lips are brought into cooperative relation with any suitable folding mechanism for folding the lips of the bag into a configuration which will effectively close the bag. The fold to be given the bag lips may vary with different sizes and characters of bags, and the different kinds of materials used therein, and it is to be expressly understood that within the broader aspects of this invention the folding mechanism may give the bag lips any suitable fold. However, I prefer to fold the bag lips in two separate steps, during the first of which the lips of the bag are bent over into parallel relation with the body of the bag, and in the second of which the fold is bent over in the opposite direction, approximately midway of its width, so that a quadruple fold is formed.

Any suitable mechanism may be provided for giving to the bag lips the folds just described, but I prefer to have the folds formed progressively as the filled bag traverses the machine on the endless carrier 23. To this end, the upper longitudinal of the machine frame has secured thereon in any suitable way a plurality of pairs of rollers with associated folding plates which, as the bag progresses through the machine, cooperate with the lips of the bag to progressively crease and fold the bag material into the desired conformation. As shown in Fig. 1a the sets of rollers are mounted so that the first pair of rollers, to act on the bag, is disposed closely adjacent to the intucking mechanism, so that the bag is already gripped by such rollers while the pressure plates 96 and 97 are retaining the bag lips in the form given by the intucking mechanism, before the pressure plates are released by reason of the bag engaging the trip member 154.

The first pair of rollers 162 (as shown in Fig. 16a) is shown as a pair of knurled rollers having the same diameter, and constitute pressing and feeding rollers, see e in Fig. 17. These rollers are also provided with a cooperating circumferential rib and groove, 163 and 164, respectively, so as to form a crease line where the bag material is to be folded.

The second, third and fourth pairs of rollers 165, 166 and 167, respectively, are also knurled rollers of equal diameter, and may also have cooperative ribs 168 and grooves 169 for maintaining the crease line. Associated with the first four pairs of rollers are cooperating folding plates 170 and 171. Plate 170 is disposed at right angles to the plane of traverse of the bag lips, i. e., horizontally, and is shown as a continuous plate apertured to receive and fit around one roller of each of the second, third and fourth pairs of rollers, and also cut out at its end edges to fit partway around one roller of each of the first and fifth pairs, although if preferred this folding plate could be formed in sections for insertion between the succeeding pairs of rollers. Plate 170 has its folding edge between the cutaway portions in alignment with the creasing ribs 163 and 168 of the succeeding pairs of rollers. Plate 171, which is also shown as a continuous plate although it could be made in sections if preferred, is a twisted plate which progressively bends from a position at right angles to the plate 170 to a position wherein it is nearly parallel therewith. Hence as the bag material passes through the second, third and fourth pairs of rollers, the portion of the lips above the crease is progressively bent by the plate 171 until it is substantially at right angles to the plane of forward traverse of the bag, as see f in Fig. 17.

The fifth, sixth and seventh pairs of rollers 172, 173 and 174, respectively, are of any suitable character for progressively advancing the folded lips as they leave the fourth pair of rollers, each of these rollers having knurled cooperating surfaces to aid in advancing the bag material. As shown, the fifth and sixth pairs of rollers 172 and 173 have one roller of each pair of greater diameter than the other roller of the pair, for the purpose of insuring that the bag material shall be advanced without tendency of the fold to get out of parallelism with the edge of the bag. The rollers of the seventh pair are of equal diameter. The rollers of the fifth pair 172 have a cooperating rib and groove, but the rollers of the sixth and seventh pairs are cut away as illustrated to make room for the folding plates to be described.

Associated with the fifth, sixth and seventh pairs of rollers 172, 173 and 174 are folding plates which receive the right angularly extending portion of the fold as formed by the folding plates 170 and 171, and bend the folded portion downwardly into parallelism with the body of the bag. One of these folding plates takes the form of a vertically extending plate 175 having an upper folding edge 176 and extending parallelly to said plate 175 is a second plate 177 which forms with said plate 175 a slot, having a flared entrance, which guides the bag material as it advances along the folding edge 176. The other folding plate 178 bends progressively from a position at right angles to the plane of movement of the bag to a position in which it is parallel to the plate 175, said plate at the latter end being given a channel-shaped formation by providing it with an extension 179 which is in alignment with the guide plate 177. Therefore, the bag lips have been folded into a parallel fold by the time that they leave the folding plates 175, 178, as see g in Fig. 17.

The thus folded bag material is then passed between a pair of knurled rollers 181 (as shown in Fig. 16), which compresses and irons the fold so far formed. Then the folded lips pass between succeeding pairs of rollers 182, 183, 184, 185, 186 and 187, all shown as having knurled feeding surfaces, with associated folding plates, whereby the parallel fold so far formed is folded a second time, approximately midway of its width and in the opposite direction from the first fold, so as to form a quadruple fold. The rollers of each of these pairs are shown as of the same diameter. The pair of rollers 182 are provided with a rib 188 and groove 189 to crease the material preparatory to the folding operations, and the rolls of the next three pairs, 183, 184 and 185, are also shown as having cooperating ribs 190 and grooves 191 to maintain the crease lines.

Associated with the pairs of rollers 183, 184 and 185 are cooperating folding plates 192 and 193, plate 192 being formed of separately supported sections 194, 195 and 196 as shown, although this plate could be made in one piece analogously as plate 170, if desired. Folding plates 194, 195 and 196 extend at right angles to the plane of movement of the bag, i. e. horizontally, and their folding edges are in alignment with the aforesaid ribs 188 and 190 of the pairs of rollers 182, 183, 184 and 185. The other folding plate 193 may take the form of separate plates paired with the plates 194, 195 and 196, but as shown it is formed in one piece and the rollers are cut away to make room for the folding plates. Plate 193 at one end is approximately at right angles to the folding edges of plate 194 and is progressively bent or twisted until it is approximately parallel to folding plate 196 at its other end, whereby a right angle fold is given to the bag lips as the first fold passes through the folding plates 192 and 193, as see $h$ in Fig. 17. It will be noted that this right angle fold is formed in the opposite direction from the first right angle fold, and that the fold line is approximately midway of the width of the first fold.

Associated with the pairs of rollers 185, 186 and 187 are folding plates 198 and 199 of the character heretofore described in connection with folding plates 175 and 178, a guide plate 200 being associated with plate 198 to form a guide slot to receive the bag material as it leaves the folding plates 192 and 193. Folding plate 199 terminates in a channel-shaped cross-section cooperating with folding plate 198, so that the right angular fold produced by folding plates 192 and 193 is bent down into parallelism with the body of the bag thereby completing the quadruple fold, as see $i$ in Fig. 17.

As the quadruple fold leaves the folding plates 198 and 199, it is received and advanced by one or more pairs of knurled rollers 201 and 202 which compress and iron the folded material and advance it into cooperative relationship with mechanism for inserting staples or applying other fastening means. While passing between these rollers the fold may be maintained by a channel-shaped plate 203, see $j$ in Fig. 17. One or more plates 204 may also be provided immediately below the channel-shaped plate 203, such a plate having its inner edge aligned with the slot of guide member 203, and this plate being so shaped and disposed that it engages the top of the bag immediately below the now completed fold and presses the side of the bag laterally and downwardly into the material contained therein, to diminish the space between the folded lips and the top of the material within the bag. Lateral guide members 205 for the bags may also be provided along the carrier 23, being shown as bent rods secured at their ends to the frame and disposed intermediate of their length so as to engage the sides of the bags travelling on the carrier 23.

The rollers heretofore described are mounted and rotated in any suitable way. As shown the rollers are rotatably mounted on spindles 206 (see Fig. 15) fixed on base plates 207, which are secured to the longitudinal of the frame in any suitable way. Mounted on each spindle adjacent the base plate 207 is a pinion 208, the pinions on the spindles of each pair of rollers being in mesh and having gear ratios in conformity with the diameters of the rollers of the pair, so that the peripheral speeds of the rollers of each pair are the same.

The several pairs of rollers are driven in any suitable way. In the form shown, a pinion 209 mounted on a stub shaft 210 meshes with a pinion 208 associated with each of the pairs of rollers 166 and 167, and idler pinions 211 of suitable size to drive the several pairs of rollers at proper speeds are interposed between the pinions 208 of succeeding pairs of rollers 166, 165 and 165, 162, on the one hand, and 167, 172 and 172, 173 and 173, 174, on the other hand, so that all of said pairs of rollers of the first group are driven simultaneously from the single driving pinion 209. Similarly, a pinion 212 meshes with the pinions 208 associated with the pairs of rollers 183 and 184, and idler pinions 213 of appropriate size are interposed between pinions associated with succeeding pairs of rollers 183, 182 and 182, 181, on the one hand, and 184, 185 and 185, 186 and 186, 187 and 187, 201 and 201, 202, on the other hand, so that all of said pairs of rollers of the second group are simultaneously driven from the common driving pinion 212.

Pinions 209 and 212 may be driven in any suitable way. As shown, stub shaft 210 carries a sprocket wheel 214 and is driven through a chain 215 from a sprocket wheel 216 mounted on the stub shaft 217 which carries the driving pinion 212 heretofore described. Stub shaft 217 also carries the pinions 35 and 36 which mesh with the pinions 34 and 37 in the gear train heretofore described, so that all of the rollers are driven from the chain 39 which in turn is driven by the electric motor 51. Moreover the drive for the rollers is also in the driving train of carrier 23 so that the endless carrier is driven synchronously with the rollers.

In order that the rollers may be adjusted toward and from each other, and may be resiliently urged into cooperative engagement but yield relatively as material of varying thicknesses passes therebetween, one roll of each pair may be mounted on a plate 220 which is slidable in ways provided on the corresponding base plate 207, said plate having a depending ear 221 which is engaged by a coil spring 222 that is seated in a cylindrical bracket 223 and adjustable by means of a set screw 224. The several folding plates heretofore described may be carried by suitable lugs or brackets 225 secured to the base plates 207 as illustrated, or the folding plates in some instances may be flanged and secured at their flanges to the base plate 207, as shown at 226, or they may be mounted in any other suitable way, as found most convenient. The base plates may be formed in sections corresponding to the groups of rollers.

As the filled bag with its lips folded as heretofore described into a quadruple fold or, as respects certain features of this invention, given any other suitable fold, leaves the folding mechanism, the bag with its folded lips is next moved into cooperative relation with means for fastening the folds of the lips, in order to retain said folds in their closed relation and permanently secure them together to effect the final closure of the bag. The character of the fastening means and the number and spacing of the fasteners used may vary with bags of different character, sizes and materials, and with bags containing different substances, also having regard to whether or not the bag must be air-tight, or non-sifting, or must meet certain statutory requirements as where the material is of poisonous character. I prefer to use wire staples, and these staples, as respects the broader aspects of this invention, may be inserted by any suitable stapling mechanism. They may be inserted by a simultaneously acting bank of a plurality of staplers, as disclosed and claimed in my Patent No. 1,653,052, granted December 20, 1927, and entitled "Stapling mechanism", or they may be inserted by a plurality of staplers which operate to insert a plurality of staples consecutively, or they may be inserted by a plurality of staplers which operate simultaneously but each stapler inserts a series of staples in sequence, as disclosed and claimed in my application Serial No. 359,060, filed April 29, 1929, and entitled "Method and machine for closing bags".

In accordance with one feature of the present invention, I use a single stapling mechanism which has oscillatory movement so that when in cooperative relationship with the bag it moves therewith, and which introduces a plurality of staples in rapid sequence as the bag is moved transversely with respect to the mean position of said stapler. If preferred, however, a plurality of said oscillatory staplers could be used so that two or more staples are inserted at each operation, but each stapler would insert a pluraliy of staples in sequence at a different portion of the length of the fold.

The stapling mechanism per se may be of any suitable construction, being shown as of the general character disclosed and claimed in my Patent Number 1,653,052 heretofore referred to. As shown in Fig. 10, a guide 227 leads wire from a suitable supporting reel 228 to and into a mechanism generally indicated as 229, such as disclosed in my aforesaid patent, for feeding the wire through a tube 230 and into cooperative relationship with a reciprocating head 231 which operates devices for cutting off suitable lengths of wire, forming the cut-off sections into staples, and advancing the staples leg-foremost toward the bag material through the staple-feed head 232. The stapler head 231 is driven by a pinion 233 which meshes with a pinion on a stub shaft 234. Shaft 234 carries a sprocket 235 over which runs a chain 236 driven from a sprocket 237 on a shaft 43 in the drive train of the machine heretofore described.

As respects this invention, the details of construction of the stapling mechanism per se are immaterial and therefore a detailed description of the particular stapling mechanism illustrated is deemed unnecessary. Said stapling mechanism is to be considered as typical of any suitable stapling mechanism for forming and introducing staples at proper speed under the control of the mechanism to be described and in accordance with the principles of operation heretofore and hereinafter explained.

Figure 11:
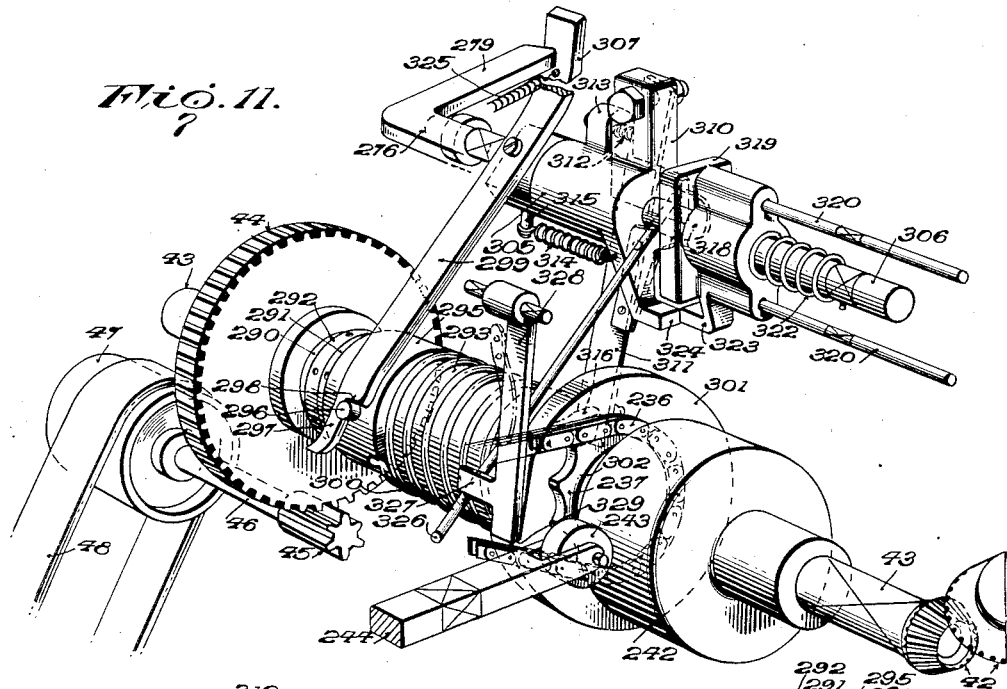
Fig. 11 is a perspective view illustrating the controlling mechanism for the stapling device.
Figure 13:
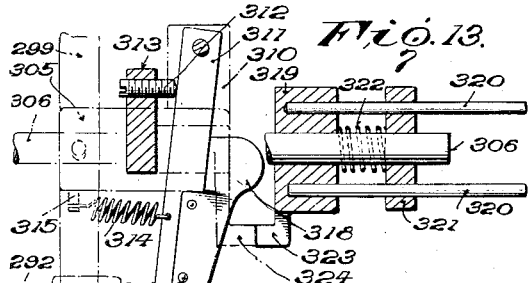
Fig. 13 is a fragmentary section through another portion of the controlling mechanism for the stapling device.
Figure 14:
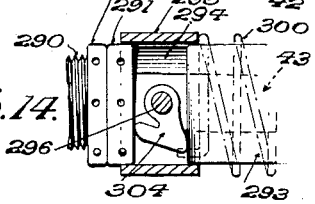
Fig. 14 is a fragmentary detail view of a portion of the clutch for the stapling mechanism.
Figure 12:
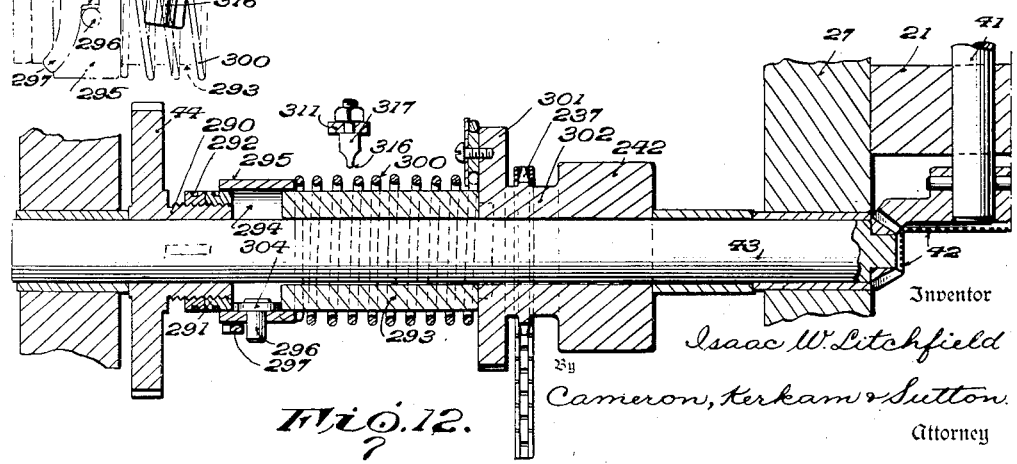
Fig. 12 is a fragmentary section through a portion of the controlling mechanism for the stapling device.

In order that said stapling mechanism may have the oscillating motion heretofore referred to, said stapling device is mounted on a platen 240, which is suitably pivoted on the machine frame at its rear end as shown at 241. Oscillatory motion is imparted to said platen by means of a cam 242 (Fig. 11) mounted on the shaft 43 and coacting with a cam follower in the form of a roll 243 mounted on the end of a rectilinearly movable bar 244 suitably guided in the frame of the machine and at its forward end bearing on an arm 246 (Fig. 10) mounted on a vertical stub shaft 247. Contact between arm 246 and bar 244 is maintained by a coil spring 248 attached to the end of the arm 246 and to the frame of the machine at 249. A set screw 250 may be interposed between a block 251 carried by the bar 244 and said arm 246, the head of said screw contacting said arm 246, so as to provide for adjustment between said arm and bar. Stub shaft 247 carries a second arm 252 which is suitably attached to a post 253 which projects downwardly from the forward end of the platen 240 and works in a suitable slot in the frame of the machine.

Until a properly folded bag is in a position to receive the staples, the stapling mechanism should remain idle, and therefore clutch mechanism for connecting the stapling mechanism with the driving mechanism is provided, and this clutch mechanism is preferably provided with associated trip mechanism so that the clutch mechanism is set in operation by the arrival of a bag in proper position to receive the staples. In the form shown a hook-shaped trip arm 260 (Fig. 2) extends into the path of the bag as it comes into alignment with the stapling mechanism so that it will be engaged and actuated by the bag. The trip arm 260 extends outwardly from a rotatably mounted post 261 carried by the frame of the machine, and said post also carries a second arm 262 which is normally held against a stop 263, as by a coil spring attached to said arm and the frame of the machine or the spring next to be referred to. In the path of movement of the arm 262 is a bell crank detent 265 pivoted on the frame of the machine at 266 and normally held in engagement with the arm 262 by a coil spring 267. One arm of said detent 265 is provided with a hook 268 which may interlock in a notch 269 in the end of a link 270, said link being pivotally connected at 271 to a second link 272 which in turn is pivotally connected at 273 to a rectilinearly movable bar 274 that extends rearwardly and is pivotally connected at 275 to a bell crank lever 276 pivoted at 277 on the frame of the machine. Bar 274 is normally urged forwardly by a coil spring 278 attached thereto at one end and to the frame at the other end. Bell crank lever 276 has a rearwardly extending arm 279 which projects into the path of an arm on the clutch mechanism to be described.

When the bag engages the trip arm 260, it causes the arm 262 to move around its axis 261 in a clockwise direction, withdrawing the hook 268 from the notch 269 and permitting the spring 278 to pull the rod 274 forwardly, causing the links 270 and 272 to articulate at their joint 271. Link 270 also carries an upstanding pin 280 which is in the path of a hook-like lateral projection 281 extending from the platen 240 of the stapling mechanism. Said hook-like extension 281 by cooperation with said pin 280 restores the trip mechanism to original position when a predetermined number of staples have been inserted in the bag.

Mounted on the shaft 43 is a clutch mechanism of any suitable character for connecting the sprocket wheel 237 and cam 242 to said shaft. In the form shown (see Figs. 11 to 14), the pinion 44, which is secured to the shaft 43 in any suitable way, has a threaded laterally-extending hub or sleeve 290 which carries an interiorly threaded collar 291 and a lock ring 292. Spaced from said hub or sleeve 290 is a sleeve 293 which is suitably attached to the shaft 43 to rotate therewith. Between the sleeves 290 and 293 is an annular chamber 294, which is closed at its periphery by a ring 295 that carries an outwardly projecting pin 296, designed to cooperate with the cam end 297 and notch 298 of an arm 299 mounted on the controlling device hereinafter described. Surrounding the sleeve 293 is a coil spring 300 having one end secured to, as by engagement in a notch of, the ring 295, and having its opposite end secured to a projection carried by a collar 301 suitably secured to the hub 302 of the sprocket 237 and cam 242 heretofore described. Spring 300 constitutes a clutch of the wrap-down type, so that said spring 300, ring 295, and collar 301, together with the parts secured thereto, rotate with the sleeve 293 when said spring 300 is tightened around said sleeve 293.

Pivotally mounted on a pin 296 carried by the ring 295 within the chamber 294 is a pawl-like member 304 which, by movement around its axis 296 as said ring 295 is moved in one direction or the other, against or by the resiliency of spring 300, grips the lateral walls of the recess 294 and causes ring 295 to rotate with the sleeves 290 and 293 or releases the ring 295 so that the sleeves 290 and 293 may rotate with respect thereto, as the case may be. When the ring 295 is rotated in one direction the spring 300 is wrapped down onto the sleeve 293 and thereby the parts connected to said spring 300 are caused to rotate with said sleeve 293, but when pin 296 is engaged by the cam end 297 of arm 299, the ring 295 is moved sufficiently to disengage the member 304 and said ring is rotated with respect to sleeve 293, by the engagement of notch 298 with pin 296, sufficiently to unwrap the spring 300 with respect to said sleeve and permit said sleeve to continue its rotation without driving spring 300 and the parts connected thereto.

Arm 299 is fixed to a sleeve 305 carried by a shaft 306 which extends above and parallel to the shaft 43. Said arm 299 projects beyond the sleeve 305 and is bent upwardly at 307 into the path of the bell crank lever 276 heretofore described, so that when the rod 274 is pulled forwardly by its spring 278, as heretofore described, the rear end 279 of the bell crank lever 276 will engage the arm 307 and tilt the arm 299 and sleeve 305 sufficiently to release pin 296. Thereupon ring 295 moves slightly to the left as viewed in Fig. 11 and the pawl-like member 304 grips the lateral walls of its annular chamber 294, causing the ring 295 to rotate in a direction to wrap down the coil spring 300 onto the sleeve 293 and therefore effect the drive of the sprocket 237 and the cam 242. The stapling mechanism is now driven from the sprocket 237 and oscillated by the cam 242 until a predetermined number of staples has been inserted into the bag fold which is now in alignment with the stapling mechanism.

Mounted on the sleeve 305 is an upstanding post 310 to which is pivoted a lever 311 that is normally held against an adjustable stop 312, secured in a bracket 313 on said sleeve, by a coil spring 314 attached at one end to said lever intermediate its length and to a post 315 on the sleeve at its opposite end. The opposite end of said lever 311 is in radial alignment with the coil spring 300 and carries a wedge-shaped projection 316, shown as formed on a post 317 carried by said lever. Projection 316 is designed to cooperate with the helix of the spring 300 so that the latter constitutes a feed for the lever 311 around its fulcrum 312. Formed on or suitably attached to the lever 311, and shown as formed on a plate suitably attached thereto, is a cam surface 318 which engages the face of a rectilinearly movable head 319 slidably mounted on the shaft 306 and carrying longitudinally extending pins 320 which project through apertures in a bracket 321, which also forms a bearing for the shaft 306, so as to prevent rotational movement of said head 319 with respect to said shaft. A coil spring 322 is interposed between said head and bracket and normally urges said head into engagement with said cam surface 318. Also extending downwardly from said head 319 is a radially and axially extending lug 323 which is designed to cooperate with a radially and axially extending lug 324 carried by the sleeve 305. When the arm 298, 307 is rotated to release the pin 296, the sleeve 305 is rotated slightly on the shaft 306 to withdraw the lug 324 out of the path of the lug 323, whereupon spring 322 moves the head 319 into engagement with the cam surface 318, in which position the lug 323 is in circumferential alignment with the lug 324 and holds the sleeve 305 in its rotated position so that the arm 299 is out of the path of the pin 296 and the feeding projection 316 is engaged in the helix of the spring 300. Thereafter, as the spring rotates, the lever 311 is fed by the projection 316 and the cam surface 318 on the lever 311 pushes the head 319 ahead of it until a predetermined number of revolutions of the coil spring 300 have been made—depending upon the number of staples which are to be introduced. At the end of this time the lever 311 has pushed the head 319 to such a position that the lug 323 is out of circumferential alignment with the lug 324, whereupon said sleeve 305 is rotated in the opposite direction, by a spring 325 acting thereon to disengage the feeding projection 316 from the spring 300, and permit the lever 311 to be returned by the spring 314, also repositioning the notch 298 in arm 299 in the path of the pin 296.

Sleeve 305 is also provided with a downwardly and forwardly projecting arm 326 which underlies a lateral projection 327 on a spring-pressed arm 328. In order that the hub of the sprocket wheel 237 and the cam 242 shall always stop in a predetermined position corresponding with the engagement of the pin 296 in notch 298, and thereby assure that the stapling mechanism will come to rest in its proper starting position, the edge of the collar 301 is provided with a notch 329 the shoulder of which is engaged by the end of the arm 328 at the same time that the notch 298 engages the pin 296, and thereby the hub of the sprocket wheel and cam will be locked against further rotational movement until such time as the bell crank lever 276 again engages the arm 307 and rotates the sleeve 305 to raise the arm 299 from the path of the pin 296, at which time the arm 326 disengages the arm 328 from the notch 329.

The parts are so designed that the shaft 43 will make one complete revolution during the period when the stapling device is going through one complete cycle, and the gear trains are so designed that during a single revolution of the shaft 43, the cam 242 produces an oscillation of the stapling mechanism while the stapling mechanism is being operated from the sprocket 237, the stapler head 232 moving with the bag during the period of insertion of each staple. Any desired number of staples can be formed and inserted through the folds of the closed bag depending upon the period the feed member 316 is held in engagement with the spring 300 by the lugs 323 and 324, and therefore one or both of said lugs may, if desired, be made adjustable so as to increase or decrease the period of their remaining in circumferential alignment and thereby increase or decrease the number of staples to be inserted during each cycle of operation of the stapling mechanism.

When the sleeve 305 is returned to its original position in the manner heretofore described, the arm 307 carried thereby engages the bell crank lever 276 and moves the bar 274 into such a position that the hook 281 carried by the stapler platen 240 may, through its action on the pin 280, restore the link 269 into latched relation with the detent 265.

The anvil which is associated with the stapler mechanism to bend the legs of the staple into engagement with the bag material after they have passed therethrough should move with the stapler head, so that it will always be in proper position, when the staple passes through the bag material, to bend the legs of the staple into engagement with the fold. Therefore, in the embodiments of the invention illustrated, the frame of the stapling head carries, integrally formed thereon or suitably attached thereto, a head 340 (Fig. 10) which has an inverted channel-shaped slot 341 extending therethrough, said slot 341 being in alignment with the slot in the guide plate 203 between the pairs of feed rollers 201 and 202, see K in Fig. 17. Said head 340 is also bifurcated in the direction of its length, and the head 232 of the stapling device reciprocates in said slot. Mounted in the outer end of said slot is an anvil 342 which is suitably shaped on its inner face to deflect the legs of the staple into contact with the bag material after they pass therethrough.

In the event that a staple is not formed or suitably inserted through the bag material, and thereby the closure of the bag is not completed, it is desirable that the operator of the machine be advised of that fact, or that the machine be stopped until the cause of the defect is determined and remedied. I, therefore, preferably provide automatic mechanism associated with said anvil whereby a signal will be given or the machine will be stopped if a staple does not come into contact with the anvil. While the electric circuit to be described could be used to ring a bell or produce any other desired signal, I prefer to entirely stop the machine, and in Fig. 19, I have shown somewhat diagrammatically a suitable stopping device wherein the stapler proper 345 is connected to one end of an electric circuit 346 which includes an electro-magnet 347, a source of current such as a battery 348, and connections 349 to the anvil 350. When a staple engages the anvil 350, a circuit will be completed and the electro-magnet 347 will be energized. The armature 351 of said electromagnet is shown as mounted on a slotted lever 352 fulcrumed at 353 and normally held by a spring 354 with its fulcrum pin at one end of its slot 355. Said lever, when the electromagnet is not energized, rests on a stop pin 356 in the path of a moving projection 357, such as a projection on the side of the platen of the stapling mechanism.

If the circuit through the electro-magnet is completed by a staple, the electro-magnet attracts the armature 351 and withdraws the lever 352 from the path of the projection 357, permitting the latter to travel underneath the same as viewed in Fig. 19. Should the circuit through the electro-magnet not be completed, however, the lever 352 will remain in the position shown in Fig. 19 and will be engaged and moved to the right as viewed in said figure by the projection 357, and this movement may be used to open a switch in the motor circuit. As shown, a switch 358 in the circuit 359 of the electric motor 360 that drives the machine will be opened by such a movement of the lever 352 toward the right as viewed in said figure.

For some classes of work and with bags of some formations, sizes or materials, or containing some substances, it may be preferred to perform the intucking operation by hand, in which event the machine heretofore described without the intucking mechanism may be employed. Where the intucking mechanism is not to be employed, it may also be desirable to simplify the folding mechanism, and in the embodiment of Figs. 4 to 9 I have shown operator controlled folding mechanism which takes the place of the series of rollers 162, 165, 166, 167, 172, 173 and 174.

In this form of my invention, the first parallel fold is formed between a stationary vertically-disposed folder plate 361, shown (Fig. 7) as of generally T-shaped formation, and a channel-shaped movable folder plate 362 which is designed to engage the lips of the bag and fold them down, in parallel relationship, over the stationary folder plate 361, as illustrated in Fig. 9. To this end the channel-shaped movable folder plate 362 is carried by a head 363 attached to a lever 364 which is designed to have both sliding and pivotal movement. The rear of the lever 364 is slotted as shown at 365 so that it may move relatively to its fulcrum pin 366, carried in brackets 367. The forward end of the lever carries a transverse pin 368 which projects laterally at each side of the lever and each end thereof is engaged in a cam slot 369 (Fig. 7) formed in a bracket 370 projecting upwardly from the frame of the machine.

Therefore, as the lever 364 is moved downwardly, it is also moved rearwardly during the first part of its motion as the pin 368 moves in the rearwardly inclined portion 371 of said slot 369, and then moves substantially vertically as said pin moves in the vertically disposed portion 372 of said slot, the rearward movement of the lever being permitted by the slot 365. This gives to the movable channel-shaped folding plate 362 carried by said lever, first a rearwardly wiping motion which bends the lips of the bag over the stationary folder plate 361, and then a vertical motion by which the bag lips are bent downwardly in parallel relationship on either side of said stationary folder plate.

Any suitable mechanism, operated by hand or by foot, may be used for operating the lever 364. In the form shown, a treadle 373 is carried by a lever 374 pivotally mounted on the frame of the machine at 375 and normally pulled upwardly by a coil spring 376, suitably attached thereto and to the frame of the machine. A link 377 is pivotally connected to the treadle lever at its lower end and to the lever 364 at its upper end at 378, so that the treadle and lever are normally urged upwardly but may be depressed by foot to effect the folding operation.

If it is not desirable to permit the bag to slip with respect to the endless carrier during the folding operation, or if no means are otherwise provided for holding the bag in alignment with the folding mechanism during the folding operation, means may be provided for elevating the bag off the endless carrier 23 during the folding operation. This mechanism may be normally retained in that position which holds the bag off of the carrier and it may be operated to lower the bag onto the carrier by the treadle heretofore described.

In the form shown, the bag is placed on a platform 380 which carries a rear upwardly extending plate 381 and a lateral upwardly extending plate 382, so as to form a box-like structure open on two sides in which the bag may be positioned. The stationary folding plate 361 may be carried by the rear member 381 of said structure. The belts of the endless carrier pass through slots 383 in the platform 380, and the solid portions 384 between these slots, when the platform 380 is elevated, will lift the bag off of the belts. Said box-like structure is connected to the frame of the machine by a pair of parallel links 386 pivoted to said structure at 387 and to the frame at 388. Attached to the treadle at 390 is an upwardly extending link 391 which has sliding movement in a bracket 392 on the rear member 381 heretofore described. Attached to the box-like structure is a coil spring 393 which normally pulls said structure in the direction to hold the solid portions of the platform above the endless belts, but when the treadle is depressed a knob 394 on the link 391 engages the bracket 392 and moves the box-like structure laterally and downwardly, as permitted by the parallel links 386 and against the tension of the coil spring 393 so as to lower the bag onto the endless belts just as the folding operation is completed. The stationary folder blade is disposed closely adjacent the first rollers 181 of the mechanism for completing the fold, so that the fold is seized by said rollers before the fold is released by the folding plates.

It is desirable that the stationary and movable folder plates be locked in their lower position so that the fold is retained during at least the first part of the period when the fold is being seized by the feeding and folding rollers which complete the folding operations. To this end means are provided for locking the movable folding plate in its lower position until the bag, in its movement out of the box-like structure, engages and trips the locking means. As shown, a trip lever 400 normally projects into the path of the bag as it leaves the box-like structure, and is retained in this position by the coil spring 401, but may swing around its axis 402 under the pressure of the bag, as the latter is fed forwardly by the endless carrier. The opposite end of said arm 400 is pivotally connected to a link 403, which in turn is pivotally connected to a lock bar 404 which is pivotally mounted on the frame at 405 and projects downwardly along side of the treadle lever 374, where it is notched to engage over the top of the said treadle lever 374 and retain the same in its lowermost position. When the bag engages the arm 400, the lock bar 404 is pulled laterally around its pivot 405, against the tension of the spring 401, to release the treadle lever 374, whereupon the spring 376 raises the treadle and movable folder plate 362. But whenever the treadle lever is again depressed, the notch in the lock bar 404 is snapped into interlocking engagement with the treadle lever by the action of the coil spring 401, and the movable folder plate is locked in its lower position.

Also mounted on the lever 364 is an upstanding bracket 410 which carries pivotally mounted thereon at 411, a bell crank lever 412 having an inwardly extending arm 413 that engages a bracket 414 on the frame when the treadle is depressed. When said arm 413 is not in engagement with said bracket 414 the opposite end 415 of said lever is pressed outwardly from the bracket by a suitable spring, so as to overlie a lever 416 pivoted on the frame of the machine at 417 and having at its forward end an upwardly and inwardly extending curved projection 418 which is adapted to engage a lug 419 (Fig. 8) attached to the slidable mounting plate 420 of the roller 421 of the first pair of rollers 181. When the lever 364 is in its uppermost position the arm 415 overlies the lever 416 and, therefore, as the treadle is depressed, arm 415 engages lever 416 and moves it around its axis 417 until arm 418 engages the lug 419 and opens the rollers 181 against the tension of spring 422 at the instant when the fold is completed and the bag is moved onto the endless carrier. When the arm 413 of lever 412 engages the bracket 414, the arm 415 of said lever is withdrawn from over the lever 416 and the latter returns to normal position, permitting spring 422 to close the rollers 181 and thereby grip and feed the fold on the bag at the same time that the bag is lowered onto the carrier 23.

From the rollers 181 on, the remainder of the machine may be and is illustrated as of the same construction as that of the embodiment of Figs. 1, 2, 3, etc., the progress of the bag through the machine being diagrammatically illustrated at $a$ to $h$ in Fig. 18.

As the operations of the several mechanisms heretofore described in detail have been covered from time to time during the description of the structures illustrated, it will be sufficient to summarize briefly the operation of machines as a whole.

In the embodiment of Figs. 1, 2, 3, etc., the filled bag is placed by hand, or automatically in any suitable way, as by the discharge mechanism of a bag filling machine, on the projecting portion of the endless carrier 23, and thereafter the operation is entirely automatic, the bag being intucked and folded and the folds fastened together by a series of operations which are entirely automatic.

As the filled bag enters the intucking mechanism it engages the gate 125 which is swung around into a position approximately at right angles to the endless carrier, wherein the latch 130 engages the detent plate 128. This movement of the gate effects the release of the head 79, which drops to insert the lateral plates 80 and 81, while close together, into the mouth of the bag, following which operation said plates are separated by their springs to open the mouth of the bag. The falling of the head 79 effects the release of the clutch 133, and the shaft 58 thereupon makes a single revolution, during which the intucker blades 70 and 71 are first moved inwardly to make the intucked folds, and then outwardly to initial position. As the intucker blades move inwardly the pressure plates 96 and 97 are forced inwardly by pins 103, and they move the lateral plates 80 and 81 inwardly in synchronism with the movement of the intucker blades. The pressure plates are locked in their innermost position by the lock bar 109, and the lateral plates 80 and 81 are lifted out of the bag as the head 53 makes its upward stroke. As the head 53 completes its upward stroke the latch plate 128 is tripped, permitting the filled bag to swing the gate 125 because of the tendency of the endless carrier 23 to feed the bag, whereupon the bag moves out of the intucker mechanism while its intucked folds are retained by the pressure plates 96 and 97, the pressure plates being eventually tripped and restored to original position when the bag engages the trip member 154.

As the bag moves out of the intucking mechanism, and while its intucked folds are still retained by the pressure plates 96 and 97, the lips of the bag are engaged and fed by the first pair of rollers 162, which also crease the material of the bag lips. The bag lips are progressed by the succeeding pairs of rollers in synchronism with the movement of the bag by the endless carrier 23, and as the bag is then progressed through the folding mechanism the folding plates first bend the lips of the bag at right angles and then into a parallel fold, and then the parallel fold is creased on the opposite side and said fold is bent in the opposite direction at right angles, about a line approximately midway of the width of the first fold, and this latter fold is then folded down into parallel relation, completing the quadruple fold.

The quadruple fold is advanced and guided by the rollers 201 and 202 and the channel-shaped plate 203 until the fold is aligned with the stapling mechanism, at which time the bag engages the trip member 260 and releases the bar 274 which under the action of its spring 278 causes the bell crank lever 276 to engage and operate the end 307 of arm 299 on the clutch mechanism. The clutch mechanism, released by the disengagement of the notch 298 from the pin 296, drives the sprocket 237 and the cam 242 to form and drive staples into the fold of the bag, the head 340 of the stapling mechanism moving forwardly in synchronism with the bag as it moves on the endless carrier 23 during the period when the staple is being driven through the fold, and moving backwardly along the fold to position for the insertion of the next staple during the interim between the forward feed of the staples. The number of staples inserted is controlled by the period when the lugs 323 and 324 are in circumferential alignment, and as they pass out of circumferential alignment the parts of the clutch controlling mechanism are restored to initial position and the clutch is disconnected at the end of a cycle of operation. The bag with a plurality of staples inserted through its fold is now fed out of the machine by the endless carrier 23. If automatic stop mechanism is provided as illustrated in Fig. 19, the machine is stopped by the failure of the machine to insert a staple.

In the embodiments of Figs. 4 to 10 the bag is placed on the platform 380, and if the mouth is to be intucked, the intucking may be done by hand—as for instance where the bag as initially formed is provided with intucked sides, the filled bag can be readily manipulated by hand to close the intucked folds and hold the lips of the bag together as the bag is seated on the platform 380. The operator then steps on the treadle 373 and depresses the movable folder blade 362 which forms a parallel fold over the edge of the stationary folder blade 361. As the movable folder blade reaches the bottom of its stroke the boxlike structure 380, 381, 382 is lowered to deposit the bag onto the endless carrier 23 and the lever 416 is operated to open the first pair of rollers 181, so that the fold formed by the folding plates is immediately seized by the first pair of rollers and advanced into the machine for completing the folding operations, the movable folder blade being locked in its lower position until the fold is properly retained by the succeeding folding mechanism and the movable folder blade tripped by the engagement of the bag with the trip member 400. In this embodiment the first parallel fold is formed by the operator-controlled folding mechanism, and the second fold, to complete the quadruple fold, may be formed by folding plates associated with rollers as described in conjunction with the first embodiment, or by any other suitable folding mechanism. The endless carrier 23 then moves the completed fold into operative relation with fastening mechanism which may be of any suitable character, that shown being of the same construction and manner of control and operation as more particularly described in conjunction with the first embodiment.

It will therefore be perceived that a novel method and machine for closing bags have been provided whereby a strong, tight closure may be rapidly effected by a continuously progressive procedure which is applicable whether the mouth of the bag is to be intucked mechanically or by hand. Moreover, a novel method and machine have been provided whereby the open mouth of a bag may be rapidly intucked, the lips thereof rapidly and progressively folded into a quadruple fold, and the folds rapidly and strongly secured together by fastening mechanism which does not hold up the progress of the bag. Additionally, the method and machine disclosed are available for either large or small bags and bags formed in a variety of ways, and whether the material thereof be stiff or flexible, or thick or thin. The closure formed may be substantially airtight and non-sifting, so as to satisfy the exactions of laws relating to containers for poisonous materials and the like, and it is also strong and durable so that it is unlikely to be broken by the rough handling to which the bag may ordinarily be subjected. The novel method and machine may operate at such speed that a single machine may handle all of the output of a bag filling machine, and all operations be entirely automatic, although if preferred hand labor may be employed in the initial stages.

Furthermore, the machine of this invention assures that the folding mechanism shall not go into operation until the intucking mechanism has completed its work, and the fastening mechanism will not go into operation until the completed fold is in alignment therewith. Also a failure to properly fasten the mouth of the bag may result in a stoppage of the machine. The fastening mechanism is oscillated simultaneously with the movement of the bag and is in synchronism with the bag during the period of insertion of each fastening device, and therefore the folds are secured together without retarding the progress of the bag. The machine is strong and rugged in construction, certain in operation, and relatively simple in its constitution, and yet capable of operating at high speed while performing all of the operations, or such part thereof as desired, automatically and under automatic controls.

While the combination including the intucking mechanism has been shown as applied to the closing of filled bags the subcombinations including either or both of the folding mechanism and the stapling mechanism could be used with equal facility in bag closing machines wherein the end of an unfolded bag is folded and fastened in the manufacture of the bag.

While the embodiments of the invention illustrated on the drawings have been described with considerable particularity, it is to be expressly understood that the invention is not restricted thereto, as the same is capable of receiving a variety of other mechanical expressions, some of which will now readily suggest themselves to those skilled in the art, while changes may be made in the details of construction, arrangement and proportion of parts, and certain features used without other features, without departing from the spirit of the invention. For example, mechanism for pasting the lips of the bag together could be employed in place of fastening the folds by staples or other forms of fasteners could be used; also other forms of mechanism for producing the quadruple or other types of folds could be substituted for the folding mechanism illustrated; also other forms of intucking mechanism could be employed, such for example as intucking mechanism which moves with the bag as disclosed in my Patent No. 1,851,626, previously identified. Reference is therefore to be had to the claims hereto appended for a definition of the limits of the invention.

What is claimed is:

1. The method of closing filled bags which includes advancing the filled bag and while said bag is advancing folding the bag material into a fold having substantially parallel sections and then folding said sections approximately midway of their width into a quadruple fold, and uniting the folds in said last named relationship.

2. The method of closing filled bags, which includes advancing the filled bag and while said bag is advancing progressively folding the bag material into a single fold having substantially parallel sections and then progressively folding said sections approximately midway of their width into a quadruple fold, and uniting the folds in said last named relationship.

3. The method of closing filled bags which includes advancing the filled bag and while said bag is advancing forming a right angle fold in the lips of the bag, deflecting the folded section into parallelism with the body of the bag, then forming a right angle fold approximately midway of said first named fold and then deflecting said last named fold into parallelism with the body of the bag, and uniting the folds in said last named relationship.

4. The method of closing filled bags which includes advancing the filled bag and while said bag is advancing progressively forming a right angle fold in the lips of the bag, progressively deflecting the folded section into parallelism with the body of the bag, then forming a right angle fold approximately midway of said first named fold and then progressively deflecting said last named fold into parallelism with the body of the bag, and uniting the folds in said last named relationship.

5. The method of closing filled bags which includes advancing the filled bag and while said bag is advancing progressively folding the bag material into a fold having substantially parallel sections and then progressively folding said sections approximately midway of the width of said sections and in the opposite direction to form a second fold having substantially parallel sections, and uniting the folds in said last named relationship.

6. The method of closing filled bags which includes advancing the filled bag and while said bag is advancing folding the bag material into a fold having substantially parallel sections and then folding said sections in the opposite direction to form a second fold having substantially parallel sections, and uniting the folds in said last named relationship.

7. The method of closing filled bags which includes advancing the filled bag and while said bag is advancing forming a 180° fold in the lips of the bag and then forming a second 180° fold approximately midway of said first named fold and in the opposite direction, and uniting the folds in said last named relationship.

8. The method of closing filled bags which includes advancing the filled bag and while said bag is advancing progressively forming a 180° fold in the lips of the bag and then progressively forming a second 180° fold approximately midway of the width of said first named fold and in the opposite direction, and uniting the folds in said last named relationship.

9. The method of closing filled bags which includes advancing the filled bag and while said bag is advancing forming a 180° fold in the lips of the bag and then forming a second 180° fold approximately midway of said first named fold, and uniting the folds in said last named relationship.

10. The method of closing filled bags which includes forming intuck folds in the ends of the bag mouth, advancing the bag and while the bag is advancing folding the lips of the bag into a quadruple fold, and securing said quadruple folds together.

11. The method of closing filled bags which includes forming intuck folds in the ends of the bag mouth, folding the bag lips into a 180° fold, forming a second 180° fold approximately midway of said first named fold, and securing said folds together.

12. The method of closing filled bags which includes forming intuck folds in the ends of the bag mouth, forming a 180° fold in the lips of the bag, forming a second 180° fold in the opposite direction in the sections of the first named fold, and securing said folds together.

13. The method of closing filled bags which includes forming intuck folds in the ends of the bag mouth, forming a 180° fold lengthwise of the bag lips, progressively forming a 180° fold approximately midway of the sections of said first named fold, and securing said folds together.

14. The method of closing filled bags which includes forming intuck folds in the end of the bag mouth, forming a 180° fold lengthwise of the lips of the bag, progressively forming in the opposite direction a second 180° fold, and securing said folds together.

15. The method of closing filled bags which includes folding the lips of the bag parallelly to their length, advancing the bag and while the bag is advancing moving fastening mechanism in synchronism with the bag and operating said fastening mechanism as the bag moves forwardly to unite the sections of the said fold.

16. The method of closing filled bags which includes folding the lips of the bag parallelly to their length advancing the bag and while the bag is advancing oscillating fastening mechanism step-by-step into and out of engagement with the fold, moving the fastening mechanism in synchronism with the bag while in engagement therewith and during said periods of engagement operating said fastening mechanism to unite said fold as the bag is advancing.

17. The method of closing filled bags which includes advancing the bag, progressively forming a fold in the lips of the bag as the bag advances, moving fastening mechanism in synchronism with the advance of said bag and actuating said fastening mechanism as said bag advances to progressively secure said folds together.

18. The method of closing filled bags which includes advancing the bag, progressively forming a fold lengthwise of the lips of the bag as the bag advances, and progressively introducing fastening elements into said fold by moving fastening mechanism step-by-step into and out of engagement with the fold during the advance of said bag.

19. The method of closing filled bags which includes forming intuck folds in the ends of the bag mouth, forming folds lengthwise of the lips of the bag, and securing said folds together while the bag is advancing.

20. The method of closing filled bags which includes forming intuck folds in the ends of the bag mouth, progressively forming folds in the lips of the bag, and progressively applying fastening means to said folds while the bag is advancing.

21. The method of closing filled bags which includes advancing the bag, progressively forming intuck folds in the ends of the bag mouth, progressively forming folds lengthwise of the lips of the bags as the bag advances, and progressively introducing fastening means into said folds during the advance of the bag.

22. The method of closing filled bags which includes forming intuck folds in the ends of the bag mouth, folding the lips of the bag as the bag advances, and applying a plurality of fastening means to said folds at spaced points along the length thereof as the bag advances.

23. The method of closing filled bags which includes continuously and progressively advancing a bag and during such advance motion forming folds in the lips of said bag and introducing a plurality of staples through said folds.

24. The method of closing filled bags which includes forming intuck folds in the ends of the bag mouth, progressively advancing the bag while folding the lips of the bag, and introducing a plurality of staples into said folds during the advancement of said folds.

25. The method of closing filled bags which includes forming intuck folds in the ends of the bag mouth, progressively and continuously advancing the bag while folding the lips of the bag into reversed 180° folds, and introducing a plurality of staples into said folds during the advance of the bag.

26. The method of closing filled bags which includes intucking the ends of the bag mouth, progressively forming folds in the lips of the bag mouth while the bag is advancing, and moving stapling mechanism with said folds to introduce staples into said folds at a plurality of points.

27. The method of closing filled bags which includes folding the lips of the bag while the bag is advancing, and while the bag is advancing oscillating stapling mechanism into and out of engagement with said folds to insert staples at spaced points on said fold but moving the stapling mechanism with the fold during the inserting operation.

28. The method of closing filled bags which includes folding the lips of the bag, progressively refolding the first named fold, and intermittently oscillating stapling mechanism into and out of engagement with said folds to insert a plurality of staples into said folds but moving the stapling mechanism with the folds while inserting the staples.

29. The method of closing filled bags which includes intucking the ends of the bag mouth, forming folds in the lips of the bag, and moving fastening mechanism to insert fasteners at spaced points lengthwise of the fold while moving said fastening mechanism with the fold during the inserting operation.

30. The method of closing filled bags which includes intucking the ends of the bag mouth, progressively folding and refolding the lips of the bag, and moving fastening mechanism to insert fasteners at spaced points along the fold while moving the fastening mechanism with the fold during the inserting operation.

31. In a machine for closing filled bags, means for intucking the ends of the bag mouth, means for advancing the filled bag, means for folding the lips of the intucked mouth into a quadruple fold, and means for securing said folds together during the advancement of the bag.

32. In a machine for closing filled bags, means for intucking the ends of a bag mouth, means for advancing the filled bag, means for progressively forming a quadruple fold in the lips of the intucked mouth during the advancement of the bag, and means for securing said folds together.

33. In a machine for closing filled bags, the combination of means for intucking the ends of the bag mouth, means for forming a 180° fold in the lips of the intucked mouth, means for forming a reversed fold approximately midway of the width of the first named fold, and means for securing said folds together.

34. In a machine for closing filled bags, the combination of means for intucking the ends of the bag mouth, means for progressively forming a 180° fold in the lips of the intucked mouth, means for progressively forming a second 180° fold in said first fold, and means for securing said folds together in their last named relationship.

35. In a machine for closing filled bags, the combination of means for intucking the ends of the bag mouth, means for forming a 180° fold in the lips of the intucked mouth, means for progressively changing said fold into a quadruple fold, and means for uniting the folds of said quadruple fold.

36. In a bag closing machine, the combination of an endless carrier for advancing the bags, means for forming a 180° fold lengthwise of the lips of the bag, means for forming a second 180° fold lengthwise of the first named fold, and means for securing said folds together.

37. In a bag closing machine, the combination of an endless carrier for advancing the bags, means for forming a 180° fold in the lips of the bag, means for forming a second 180° fold approximately midway of the width of the sections of the first named fold, and means for securing the folds together.

38. In a bag closing machine, the combination of an endless carrier for advancing the bags, means for forming a 180° fold in the lips of the bag, means for folding the first named fold in the opposite direction into a second 180° fold, and means for securing said folds together.

39. In a bag closing machine, the combination of an endless carrier for advancing the bags, cooperating folding plates for forming a 180° fold lengthwise of the lips of the bag, cooperating folding plates for forming a second 180° fold in said first named fold, and means for securing said folds together.

40. In a bag closing machine, the combination of an endless carrier for advancing the bags, cooperating folding plates for forming a 180° fold lengthwise of the lips of the bag, cooperating folding plates for forming a second 180° fold in said first named fold and in the opposite direction to said first named fold, and means for securing said folds together.

41. In a bag closing machine, the combination of an endless carrier for advancing the bags, cooperating folding plates for progressively forming a 180° fold in the lips of the bag, cooperating folding plates for progressively forming in the opposite direction a second 180° fold approximately midway of the sections of the first named fold, and means for securing the folds together.

42. In a bag closing machine, the combination of an endless carrier for advancing the bags, cooperating folding plates for forming a 180° fold in the lips of the bag, cooperating folding plates which bend the sections of the first named fold approximately midway of their width into a right angle fold, cooperating folding plates which deflect the last named folds into parallel relationship, and means for securing said folds together in said last named relationship.

43. In a bag closing machine, the combination of an endless carrier for advancing the bags, cooperating folding plates for progressively forming a right angle fold in the lips of the bag, cooperating folding plates for progressively deflecting said folds into parallel relationship, cooperating folding plates for forming a second right angle fold in the sections of the first named fold, cooperating folding plates for deflecting said last named folds into parallel relationship, and means for securing said folds together in said last named relationship.

44. In a bag closing machine, the combination of an endless carrier for advancing the bags, means for folding the lips of the bags, and fastening means oscillating lengthwise of the bag travel for intermittently introducing separate fastening elements into said folds.

45. In a bag closing machine, the combination of an endless carrier for advancing the bags, means for folding the lips of the bags, mechanism for introducing fasteners into said fold, and means for moving said fastening mechanism lengthwise of the bag travel and with the fold during step-by-step engagements with spaced points along the length of the fold.

46. In bag closing machine, the combination of an endless carrier for advancing the bags, means for folding the lips of the bags, mechanism for introducing fasteners into said fold, and means for moving said fastening mechanism into engagement with spaced points along the length of said fold and with said fold while in engagement therewith.

47. In a bag closing machine, the combination of an endless carrier for advancing the bags, means for folding the lips of the bags, mechanism for introducing fasteners into said folds, and mechanism for moving said fastening mechanism with said fold.

48. In a bag closing machine, the combination of an endless carrier for advancing the bags, means for folding the lips of the bags, means for introducing separate fasteners into said fold, and means for oscillating said fastening means lengthwise of the fold and into a step-by-step engagement with spaced points along the length thereof.

49. In a bag closing machine, the combination of an endless carrier for advancing the bags, means for folding the lips of the bags, a stapling mechanism for introducing staples at spaced points along said fold, driving means for said stapling mechanism, and means operated by said driving means for oscillating said stapling mechanism lengthwise of the fold.

50. In a bag closing machine, the combination of an endless carrier for advancing the bags, means for folding the lips of the bags, stapling mechanism, driving mechanism therefor, and means operated by said driving mechanism for moving said stapling mechanism synchronously with the fold while inserting a plurality of staples into said fold.

51. In a bag closing machine, the combination of an endless carrier for advancing the bags, means for folding the lips of the bags, fastening mechanism, driving means therefor including a clutch, means tripped by the advancing bag for closing said clutch, and means for oscillating said fastening mechanism lengthwise of said fold and into operative engagement with spaced points along said fold when said clutch is closed.

52. In a bag closing machine, the combination of an endless carrier for advancing the bags, means for folding the lips of the bags, fastening mechanism, driving means therefor including a clutch, means for oscillating said fastening mechanism lengthwise of and synchronously with the movement of said fold when said clutch is closed, and means for closing said clutch only when a bag is in alignment with said fastening mechanism.

53. In a bag closing machine, the combination of an endless carrier for advancing the bags, means for folding the lips of the bags, stapling mechanism, driving means therefor including a clutch, means for moving said stapling mechanism lengthwise of the bag travel while forming and inserting a staple, and means tripped by an advancing bag for closing said clutch.

54. In a bag closing machine, means for moving the bag lips into the predetermined relationship in which they are to be fastened, means for progressively advancing the bag, means for fastening the bag at a plurality of spaced points, said means including a stapling mechanism, and means for driving said stapling mechanism and simultaneously oscillating the same lengthwise of the advance of the bag.

55. In a bag closing machine, means for moving the bag lips into the predetermined relationship in which they are to be fastened, means for progressively advancing the bag, means for fastening the bag at a plurality of spaced points, said means including a stapling mechanism, means for driving said stapling mechanism and simultaneously oscillating the same lengthwise of the advance of the bag, and means for initiating the operation of said stapling mechanism.

56. In a bag closing machine, means for moving the bag lips into the predetermined relationship in which they are to be fastened, means for progressively advancing the bag, means for fastening the bag at a plurality of spaced points, said means including a stapling mechanism, means for driving said stapling mechanism and simultaneously oscillating the same lengthwise of the advance of the bag, a drive shaft, a clutch for connecting said drive shaft with said driving and oscillating means, and means operated when a bag is in alignment with said stapling mechanism for closing said clutch.

57. In a bag closing machine, means for moving the bag lips into the predetermined relationship in which they are to be fastened, means for progressively advancing the bag, means for fastening the bag at a plurality of spaced points, said means including a stapling mechanism, means for driving said stapling mechanism and simultaneously oscillating the same lengthwise of the advance of the bag, a drive shaft, a clutch for connecting said shaft with said driving and operating mechanism, and means to retain said clutch closed until said stapling mechanism has inserted a plurality of staples.

58. In a bag closing machine, means for moving the bag lips into the predetermined relationship in which they are to be fastened, means for progressively advancing the bag, means for fastening the bag at a plurality of spaced points, said means including a stapling mechanism, means for driving said stapling mechanism and simultaneously oscillating the same lengthwise of the advance of the bag, a drive shaft, a clutch for connecting said shaft to said driving and oscillating means, means for tripping said clutch when a bag is in alignment with said stapling mechanism, and means to retain said clutch closed until a plurality of staples have been inserted.

59. In a bag closing machine, means for moving the bag lips into the predetermined relationship in which they are to be fastened, means for progressively advancing the bag, means for fastening the bag at a plurality of spaced points, said means including a stapling mechanism, means for driving said stapling mechanism and simultaneously oscillating the same lengthwise of the advance of the bag, and means for stopping said machine if said stapling mechanism fails to insert a staple.

60. In a bag closing machine, means for moving the bag lips into the predetermined relationship in which they are to be fastened, means for progressively advancing the bag, means for fastening the bag at a plurality of spaced points, said means including a stapling mechanism, means for driving said stapling mechanism and simultaneously oscillating the same lengthwise of the advance of the bag, an anvil for deflecting the legs of the inserted staple, an electric circuit including said stapling mechanism and anvil means for stopping said machine, and means for rendering said last named means inoperative when a circuit is completed by a staple between said stapling mechanism and anvil.

61. In a bag closing machine, means for moving the lips of the bag into the predetermined relationship in which they are to be fastened, means for progressively advancing the bag, and means for fastening the bag at a plurality of spaced points, said means including fastening mechanism and means for moving said fastening mechanism lengthwise of the bag travel so as to permit operation thereof while the bag is in motion.

62. In a bag closing machine, means for moving the lips of the bag into the predetermined relationship in which they are to be fastened, means for progressively advancing the bag, and means for fastening the bag at a plurality of spaced points, said means including fastening mechanism and means for reciprocating said fastening mechanism lengthwise of the bag travel in a stroke which is short so as to bring said fastening mechanism into cooperative relation with the bag at successive points.

63. In a bag closing machine, means for moving the lips of the bag into the predetermined relationship in which they are to be fastened, means for progressively advancing the bag, and means for fastening the bag at a plurality of spaced points, said means including fastening mechanism and means for oscillating said fastening mechanism into engagement with spaced points along the bag and moving said fastening mechanism synchronously with the bag during the fastening operation.

64. In a bag closing machine, means for moving the lips of the bag into the predetermined relationship in which they are to be fastened, means for progressively advancing the bag and means for fastening the bag at a plurality of spaced points, said means including stapling mechanism having means for forming and inserting a plurality of staples, and means for moving the stapling mechanism with the bag during the staple inserting operation and then in the opposite direction into engagement with a succeeding point on the bag.

65. In a bag closing machine, means for moving the lips of the bag into the predetermined relationship in which they are to be fastened, means for progressively advancing the bag and means for fastening the bag at a plurality of spaced points, said means including stapling mechanism having means for forming and inserting a plurality of staples, driving mechanism therefor, and means operated by said driving mechanism for moving said stapling mechanism with the bag during the staple inserting operation.

66. In a bag closing machine, means for moving the lips of the bag into the predetermined relationship in which they are to be fastened, means for progressively advancing the bag and means for fastening the bag at a plurality of spaced points, said means including stapling mechanism having means for forming and inserting a plurality of staples, driving mechanism therefor, means operated by said driving mechanism for moving said stapling mechanism with the bag during the staple inserting operation, and means for automatically discontinuing the operation of said stapling mechanism after a predetermined number of staples have been inserted.

67. In a bag closing machine, means for moving the lips for the bag into the predetermined relationship in which they are to be fastened, means for progressively advancing the bag and means for fastening the bag at a plurality of spaced points, said means including stapling mechanism having means for forming and inserting a plurality of staples, driving mechanism therefor, means operated by said driving mechanism for moving said stapling mechanism with the bag during the staple inserting operation, and means for initiating the operation of said stapling mechanism when the bag comes into operative position with respect to said stapling mechanism.

68. In a bag closing machine, means for moving the lips of the bag into the predetermined relationship in which they are to be fastened, means for progressively advancing the bag and means for fastening the bag at a plurality of spaced points, said means including stapling mechanism having means for forming and inserting a plurality of staples, driving mechanism therefor including a clutch, means operated by said driving mechanism for moving the stapling mechanism with the bag during the staple inserting operation, means normally retaining said clutch inoperative, and a trip operated by the advancing bag for effecting the operation of said clutch.

69. In a bag closing machine, means for moving the lips of the bag into the predetermined relationship in which they are to be fastened, means for progressively advancing the bag and means for fastening the bag at a plurality of spaced points, said means including stapling mechanism having means for forming and inserting a plurality of staples, driving mechanism therefor including a clutch, means operated by said driving mechanism for moving said stapling mechanism with the bag during the staple inserting operation, and means operated by said driving mechanism for rendering said clutch inoperative after a predetermined number of staples have been inserted.

70. In a bag closing machine, means for moving the lips of the bag into the predetermined relationship in which they are to be fastened, means for progressively advancing the bag and means for fastening the bag at a plurality of spaced points, said means including a stapling mechanism having means for forming and inserting a plurality of staples, driving mechanism therefor, means operated by said driving mechanism for moving said stapling mechanism with the bag during the staple inserting operation, and mechanism actuated by the failure of said stapling mechanism to insert a staple.

71. In a bag closing machine, the combination of means for moving the lips of the bag into the predetermined relationship in which they are to be fastened, stapling mechanism, means for advancing the bag past the stapling mechanism, driving mechanism therefor including a clutch, means operated by said driving mechanism for oscillating said stapling mechanism, and cooperating members driven by said driving mechanism for disconnecting said driving mechanism from said stapling mechanism after a predetermined number of oscillations of said stapling mechanism.

72. In a bag closing machine, the combination of means for moving the lips of the bag into the predetermined relationship in which they are to be fastened, stapling mechanism, means for advancing the bag past said stapling mechanism, means for oscillating said stapling mechanism in the direction of bag travel, and means for operating said stapling mechanism to insert staples during the advancement of the bag.

73. In a bag closing machine, the combination of means for moving the lips of the bag into the predetermined relationship in which they are to be fastened, stapling mechanism, means for advancing the bag past the stapling mechanism, means for oscillating the stapling mechanism in the direction of bag travel to bring said stapling mechanism into a step-by-step engagement with spaced points along the bag, and means for operating said stapling mechanism to insert a staple while said stapling mechanism is traveling with the bag.

74. In a machine for automatically closing filled bags while progressively advancing the bag through the machine, the combination of means for producing an intucked fold in the lips of the bag, means contiguous to said intucking mechanism for progressively folding the intucked lips into a plural fold, stapling mechanism for forming and inserting staples at spaced points along the length of the fold, and means for moving said stapling mechanism with the bag during the staple inserting operation.

75. In a machine for automatically closing filled bags while progressively advancing the bag through the machine, the combination of means for producing an intucked fold in the lips of the bag, means contiguous to said intucking mechanism for progressively folding the intucked lips into a plural fold, stapling mechanism for forming and inserting staples at spaced points along the length of the fold, means for moving said stapling mechanism with the bag during the staple inserting operation, and means for initiating the operation of the stapling operation when the bag reaches the stapling mechanism.

76. In a machine for automatically closing filled bags while progressively advancing the bag through the machine, the combination of means for producing an intucked fold in the lips of the bag, means contiguous to said intucking mechanism for progressively folding the intucked lips into a plural fold, stapling mechanism for forming and inserting staples at spaced points along the length of the fold, means for moving said stapling mechanism with the bag during the staple inserting operation, and means for discontinuing the operation of the stapling mechanism after a predetermined number of staples have been inserted in said fold.

77. In a machine for closing filled bags, an endless carrier for progressively advancing the bag through the machine, means for forming an intucked fold in the lips of the bag, mechanism for progressively forming a plural fold in the intucked lips, a single stapling mechanism, driving mechanism therefor, means for operating said stapling mechanism to move the same synchronously with successive sections of the fold, and means for operating said stapling mechanism to insert a staple during each advancement of the stapling mechanism with the fold.

78. In a machine for closing filled bags, intucking mechanism, mechanism for forming a fold in the intucked lips of the bag, mechanism for inserting a plurality of staples lengthwise of the fold, and an endless carrier for progressively advancing filled bags from said intucking mechanism through said folding and stapling mechanisms.

79. In a machine for closing filled bags, intucking mechanism, mechanism for forming a fold in the intucked lips of the bag, mechanism for inserting a plurality of staples lengthwise of the fold, an endless carrier for progressively advancing filled bags from said intucking mechanism through said folding and stapling mechanisms, and means actuated by the advancing bag for initiating the operation of said stapling mechanism.

ISAAC W. LITCHFIELD.